June 30, 1970  R. F. STUCCHI  3,517,612
PRINT WHEEL SETTING AND RESETTING MEANS
Original Filed Nov. 9, 1967  25 Sheets-Sheet 9

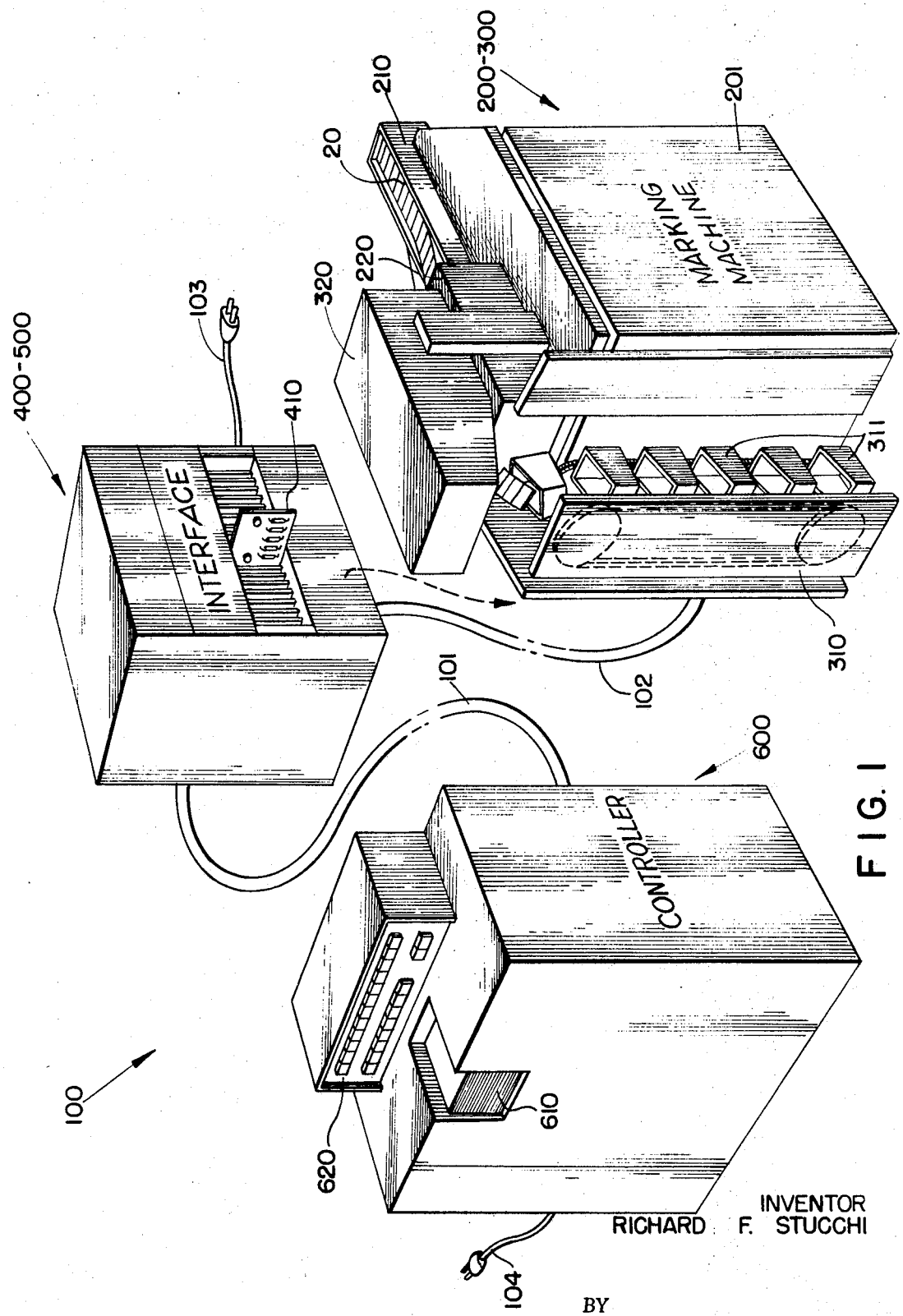

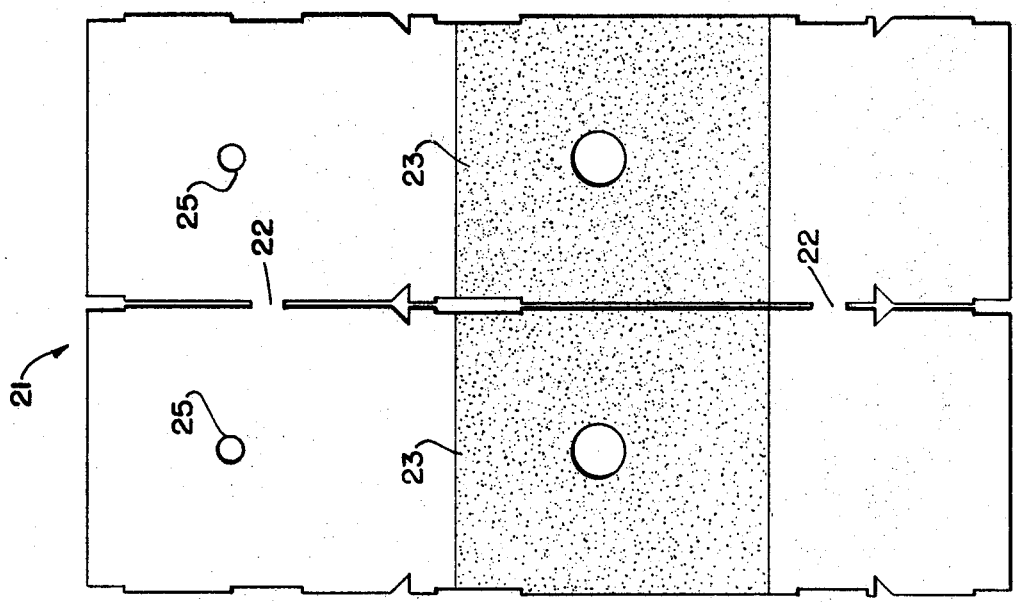
FIG. IB
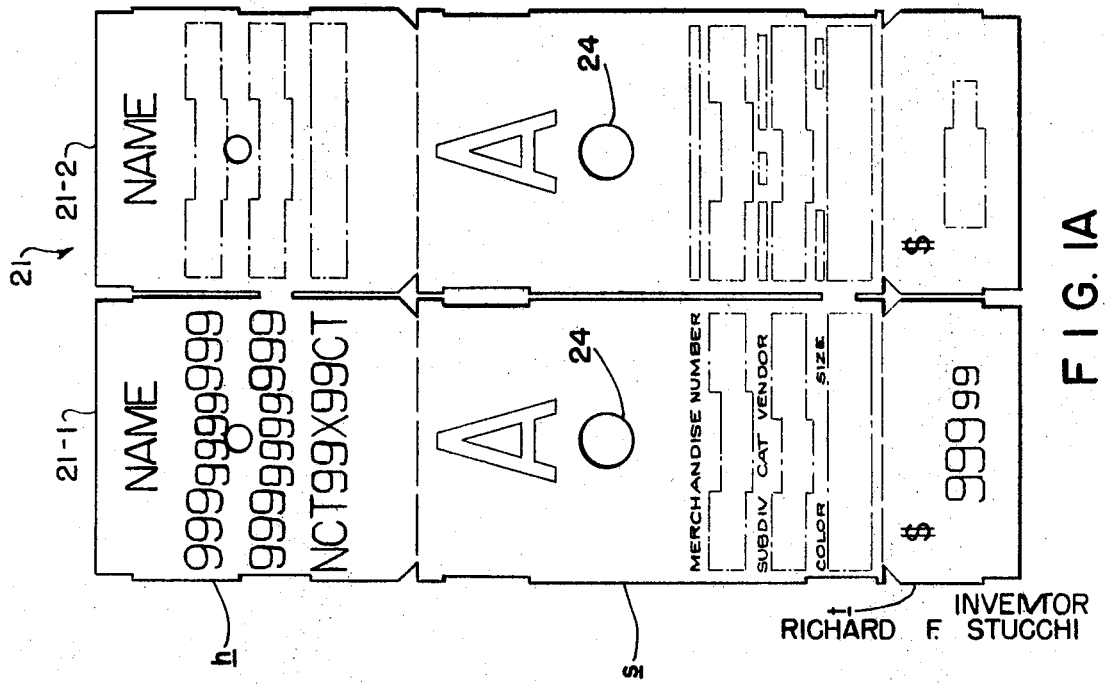
FIG. IA

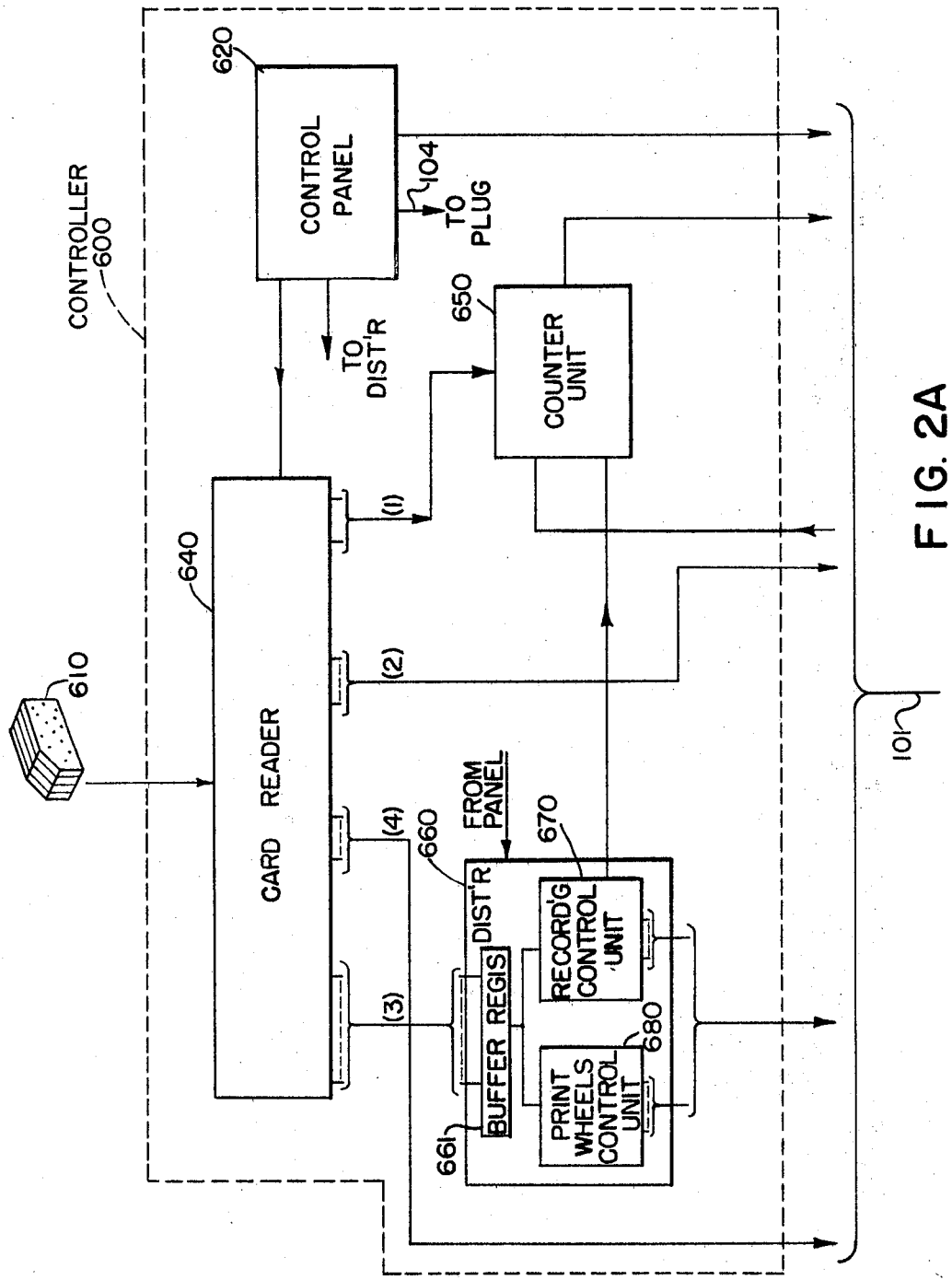

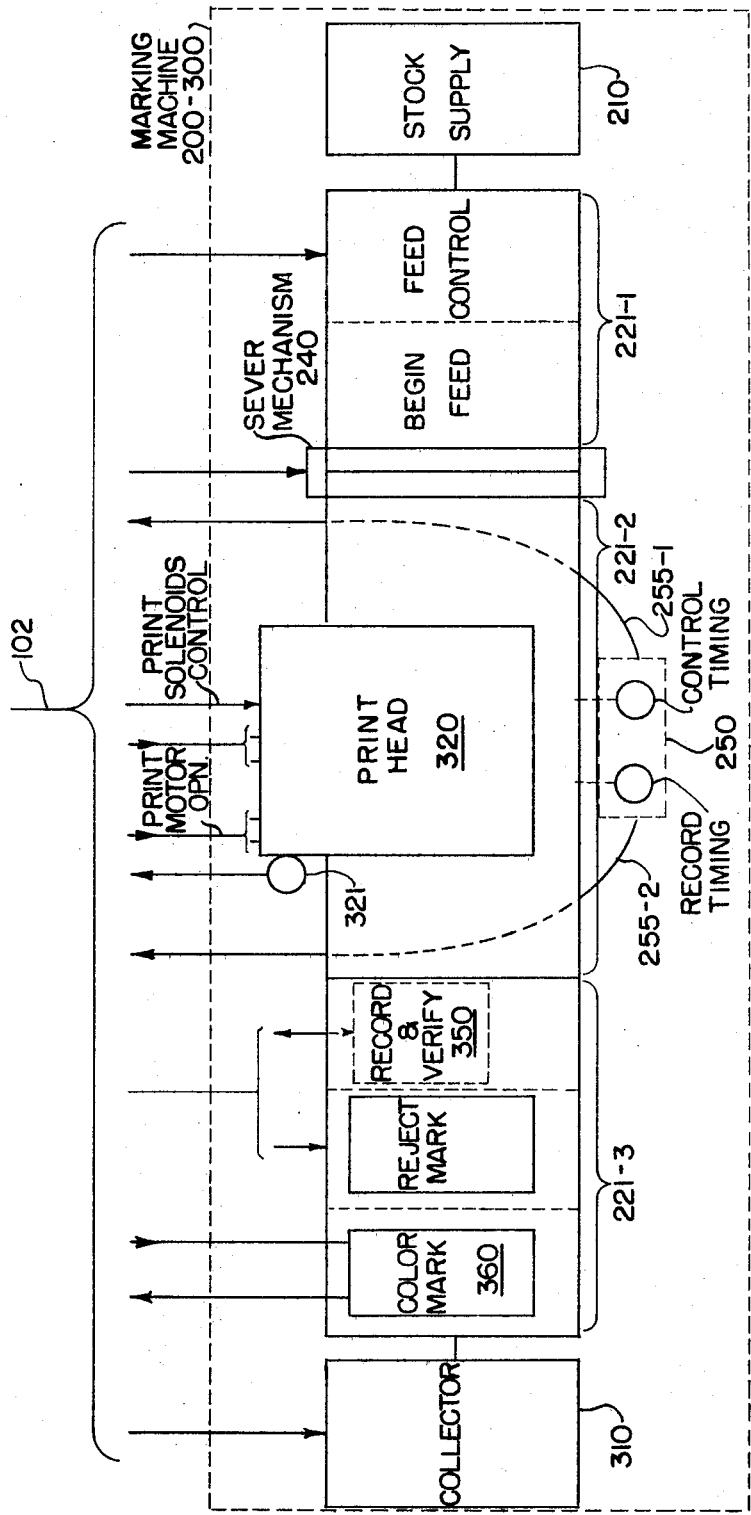

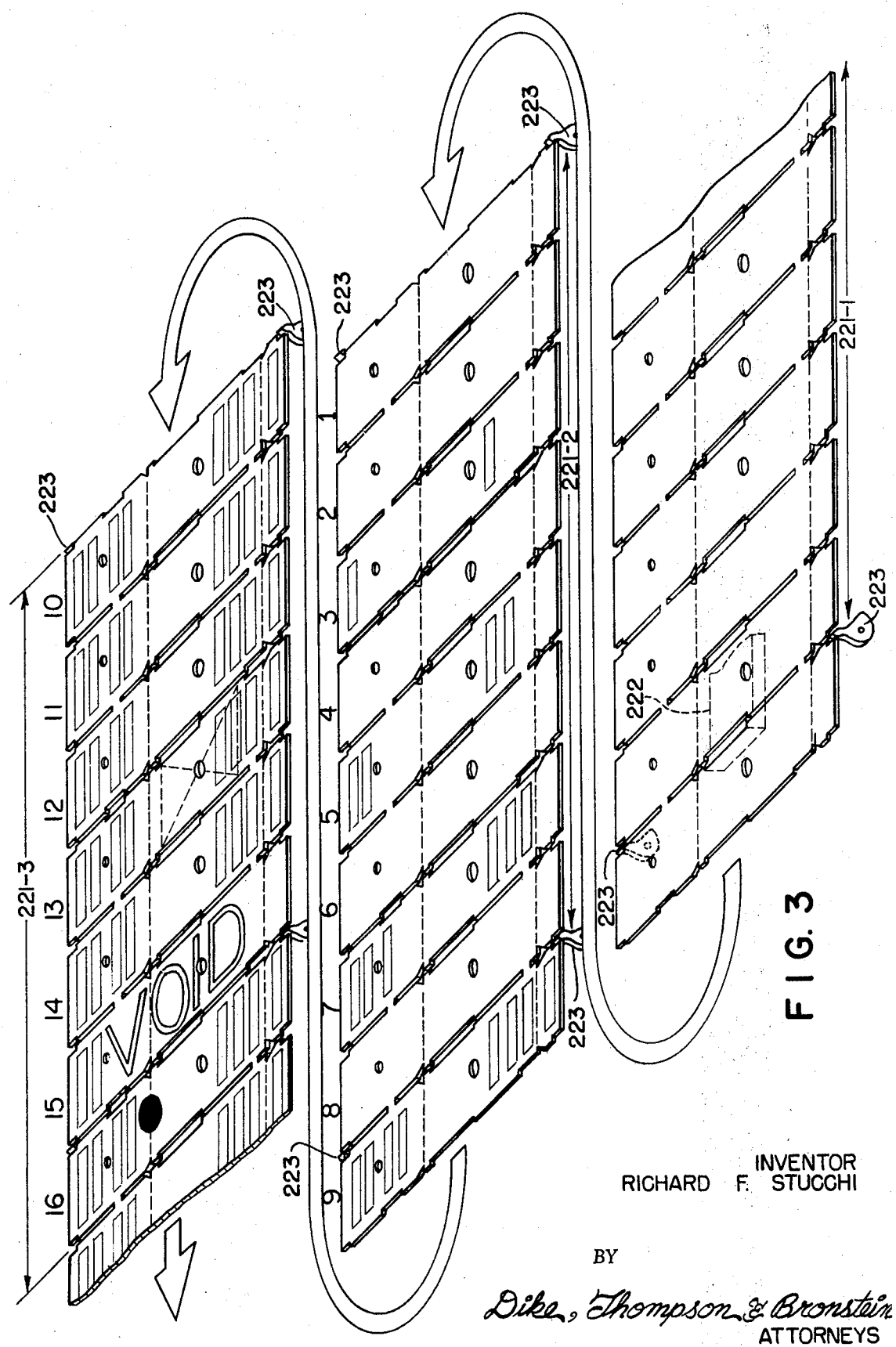

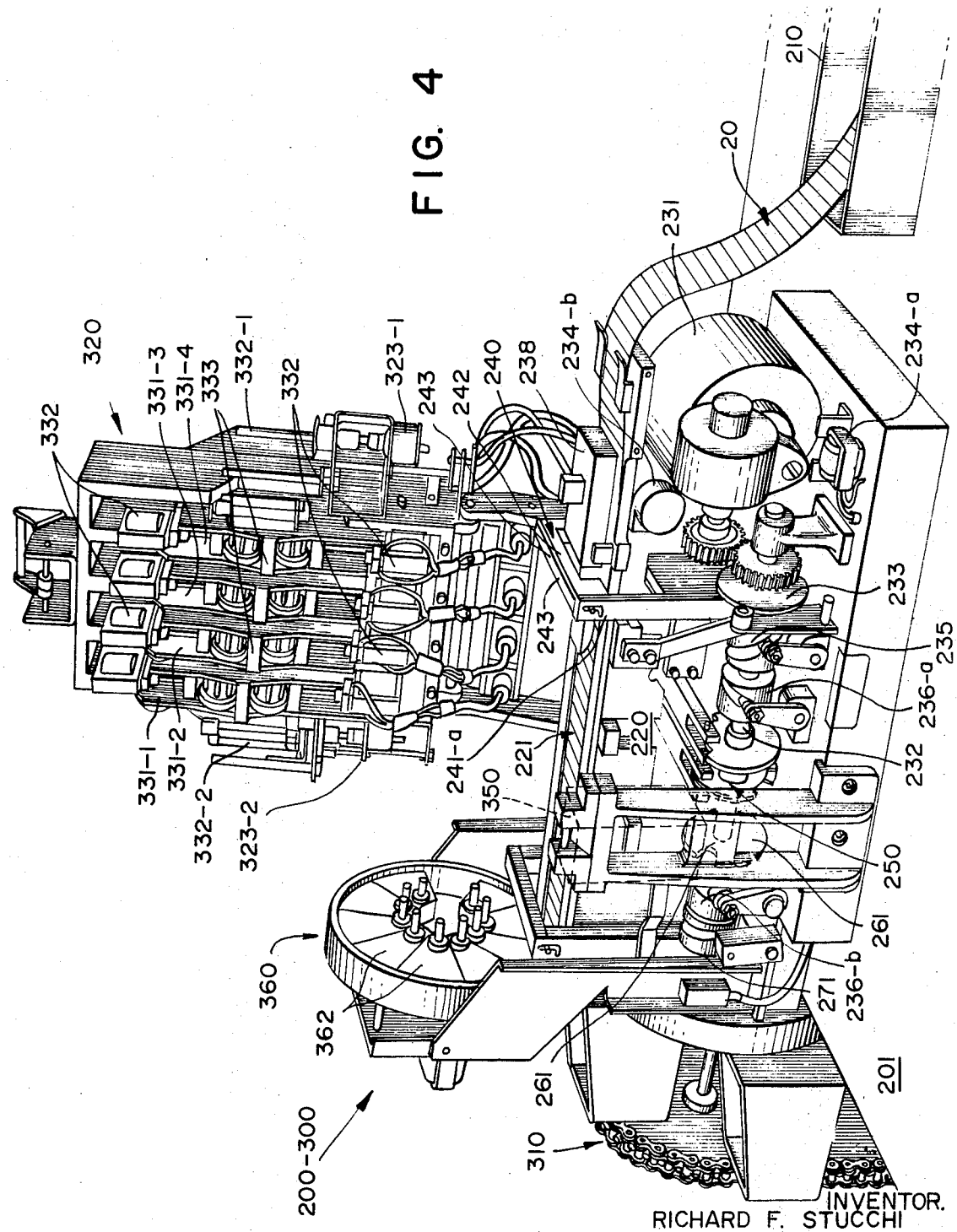

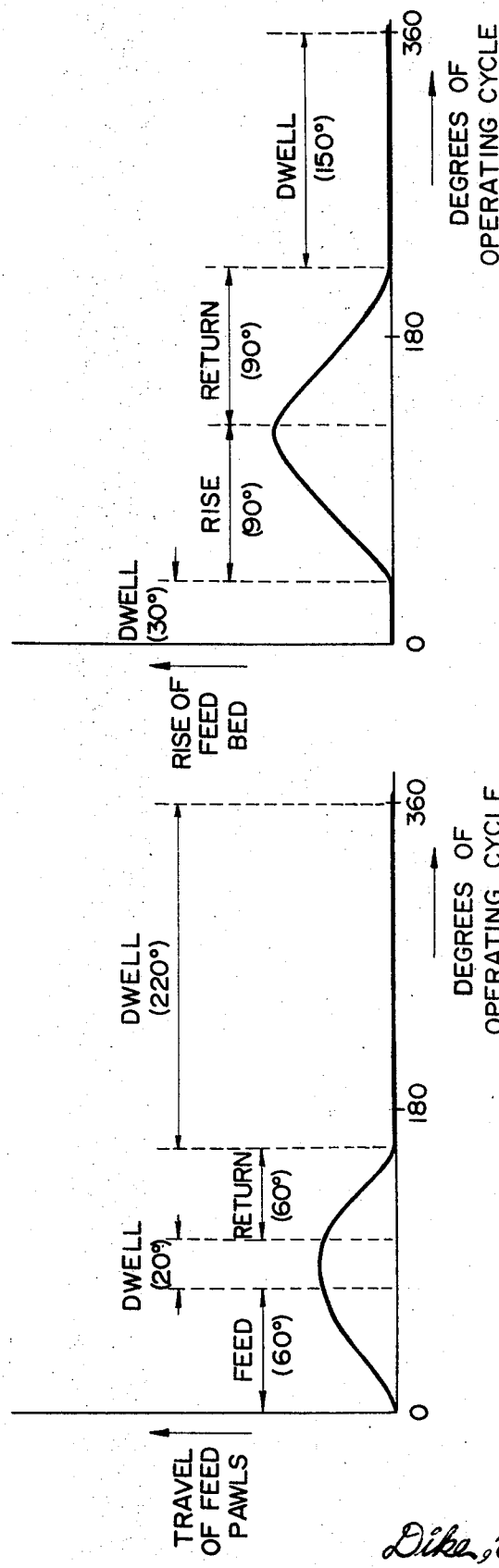

INVENTOR
RICHARD F. STUCCHI
BY
Dike, Thompson & Bronstein
ATTORNEYS

June 30, 1970  R. F. STUCCHI  3,517,612
PRINT WHEEL SETTING AND RESETTING MEANS
Original Filed Nov. 9, 1967  25 Sheets-Sheet 10

INVENTOR
RICHARD F. STUCCHI
BY
Dike, Thompson & Bronstein
ATTORNEYS

INVENTOR
RICHARD F. STUCCHI

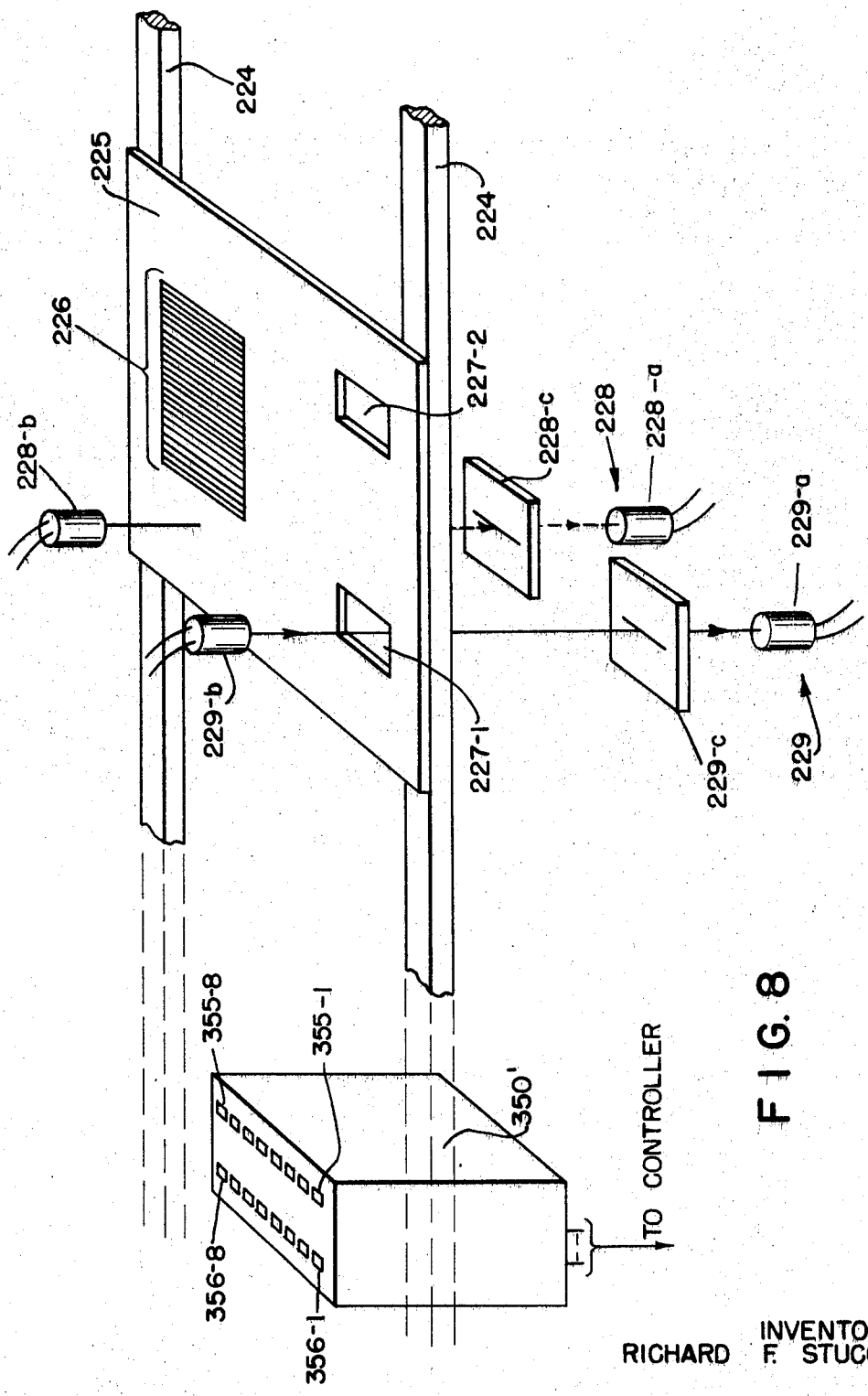

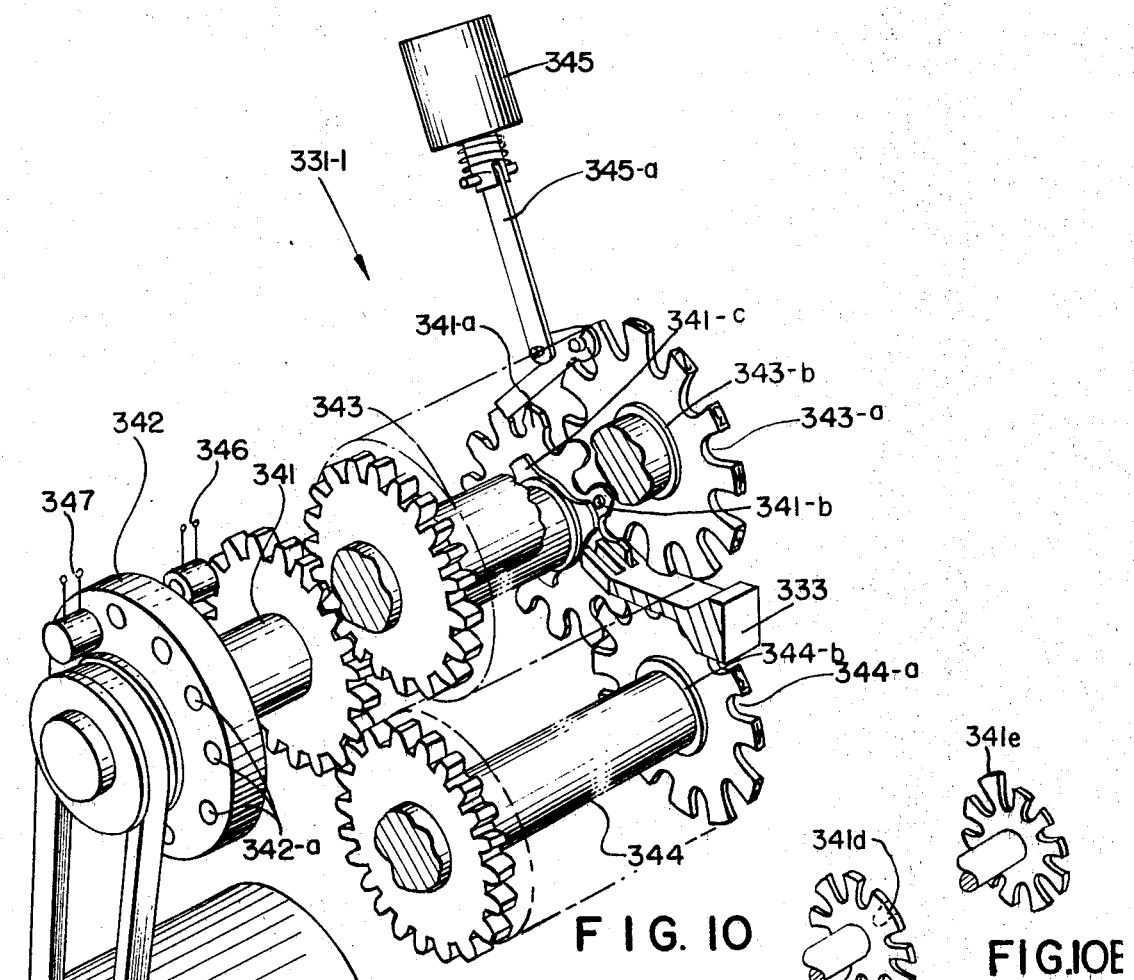
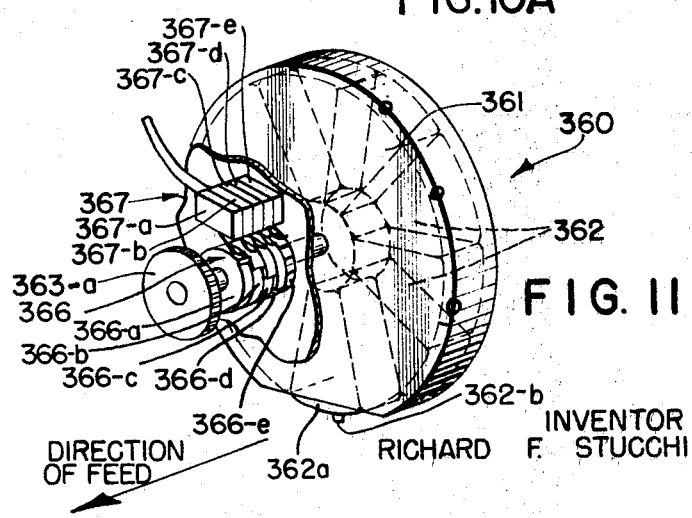
FIG. 10
FIG. 10A
FIG. 10E
FIG. 11
INVENTOR
RICHARD F. STUCCHI
BY
Dike, Thompson & Bronstein
ATTORNEYS

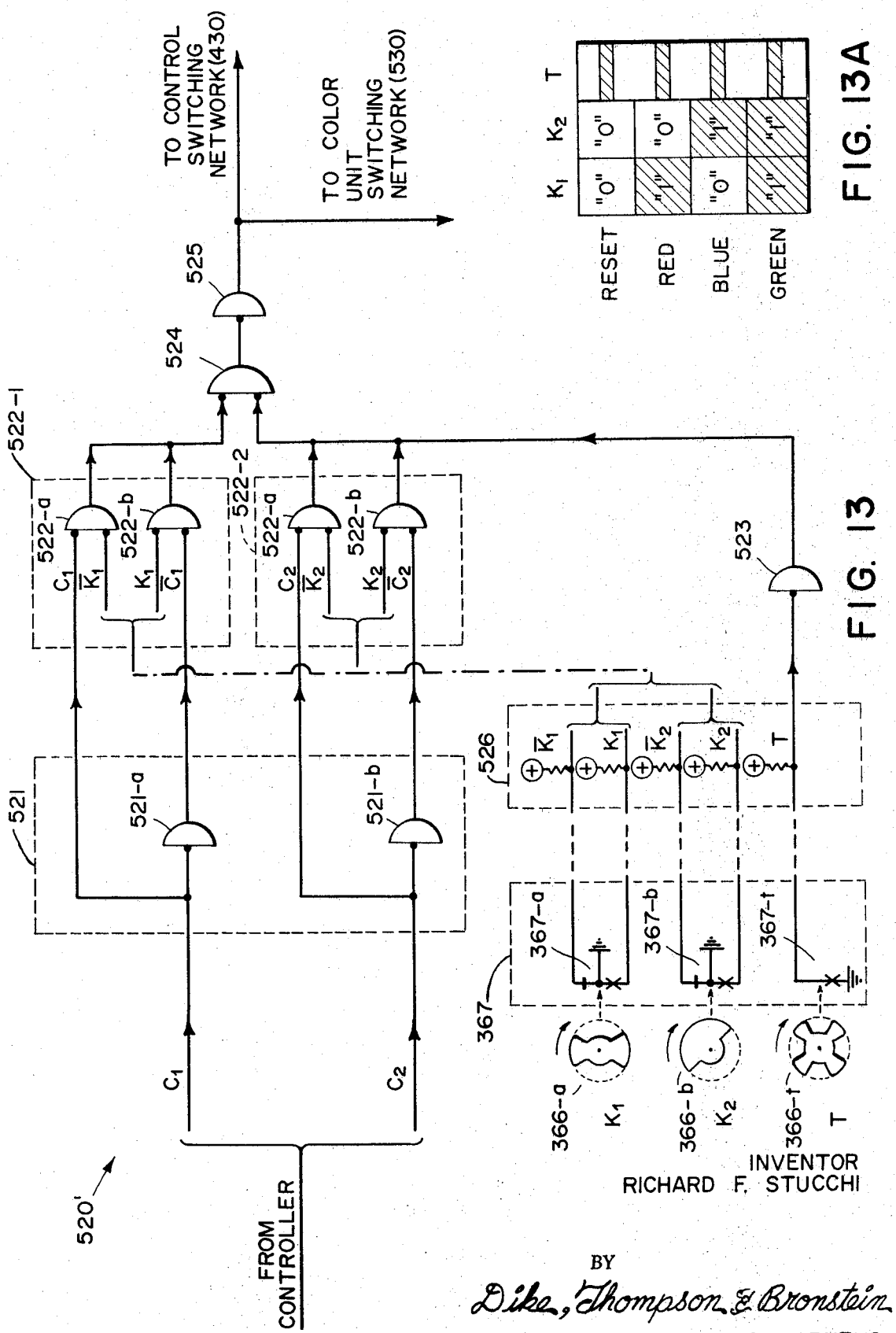

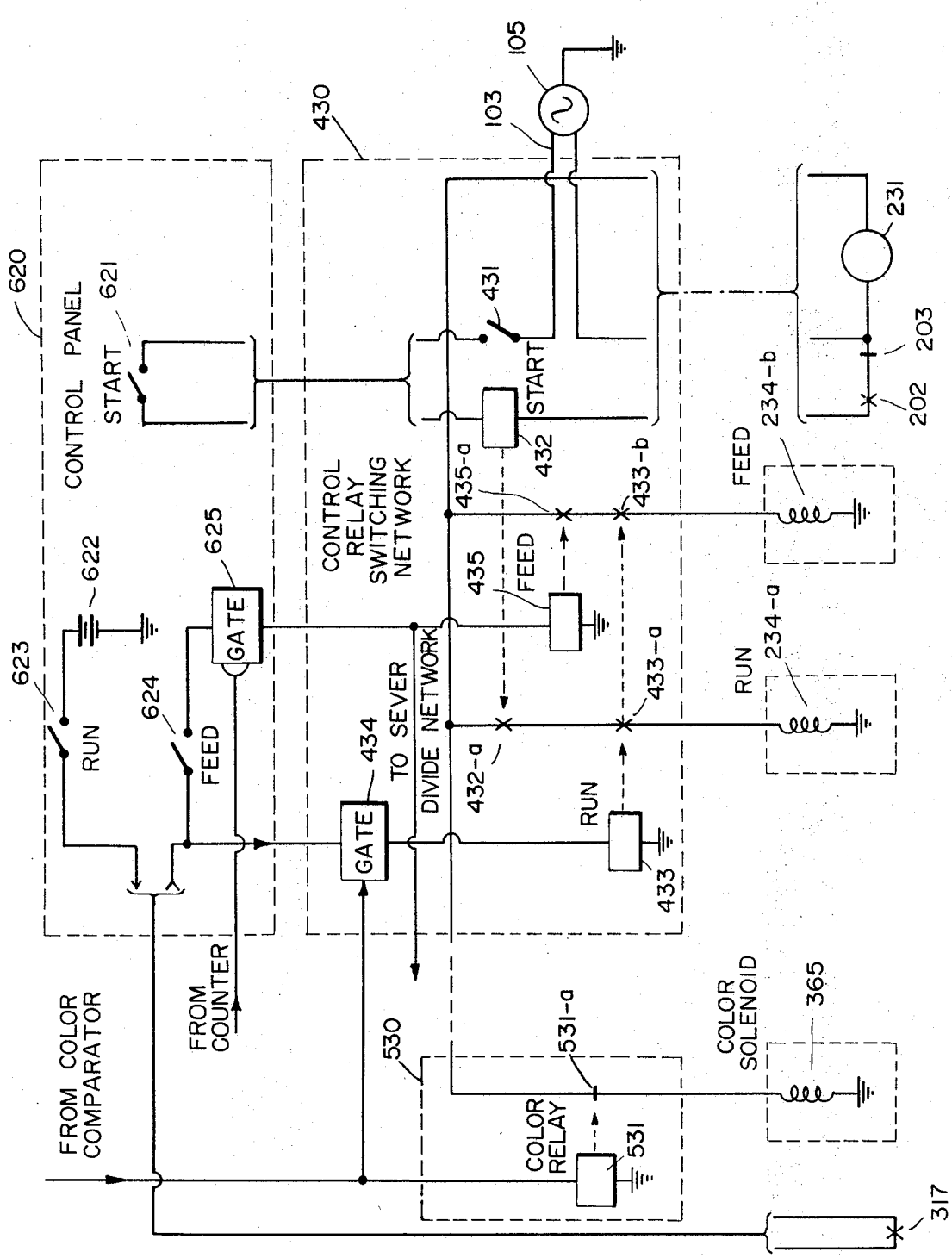

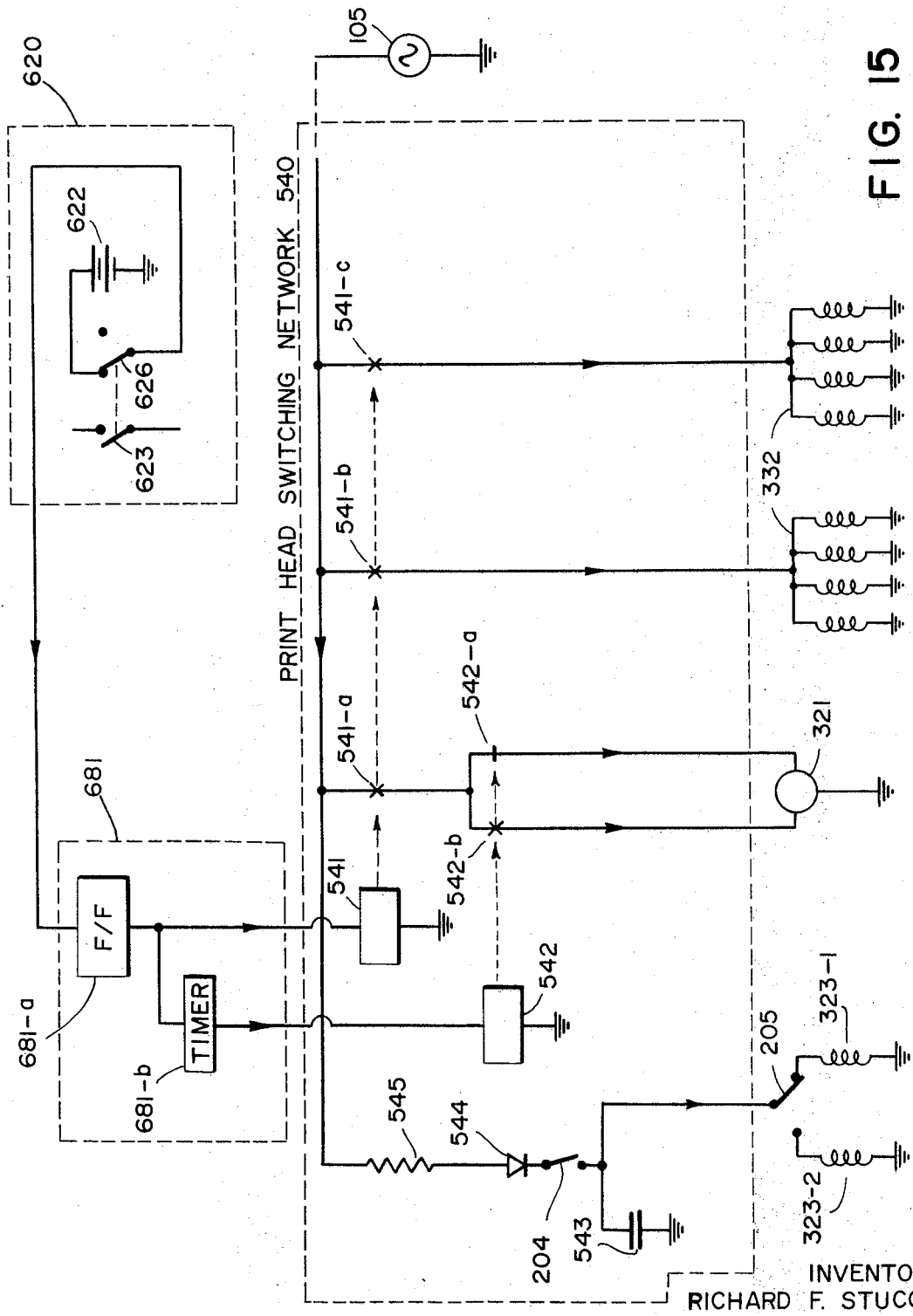

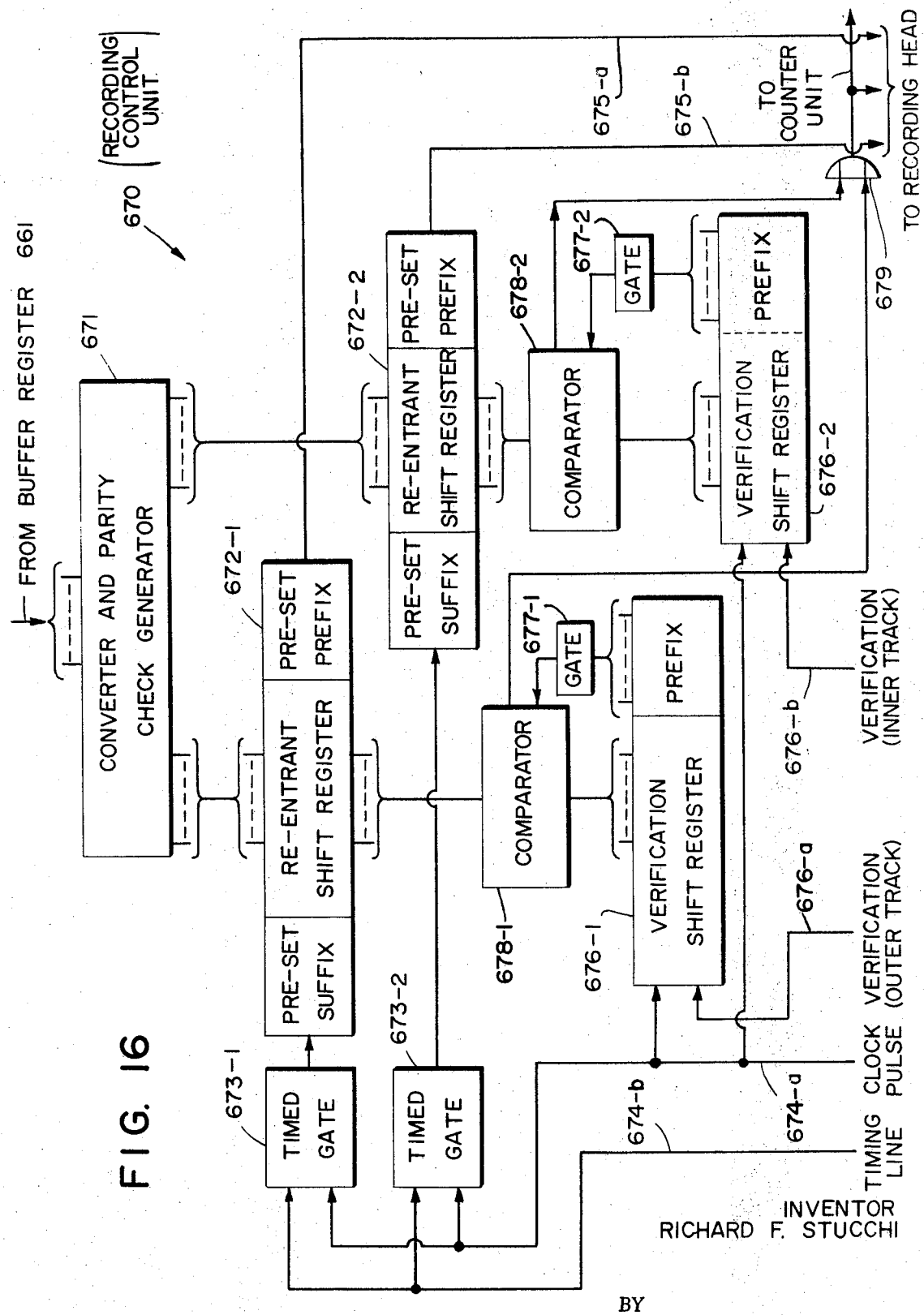

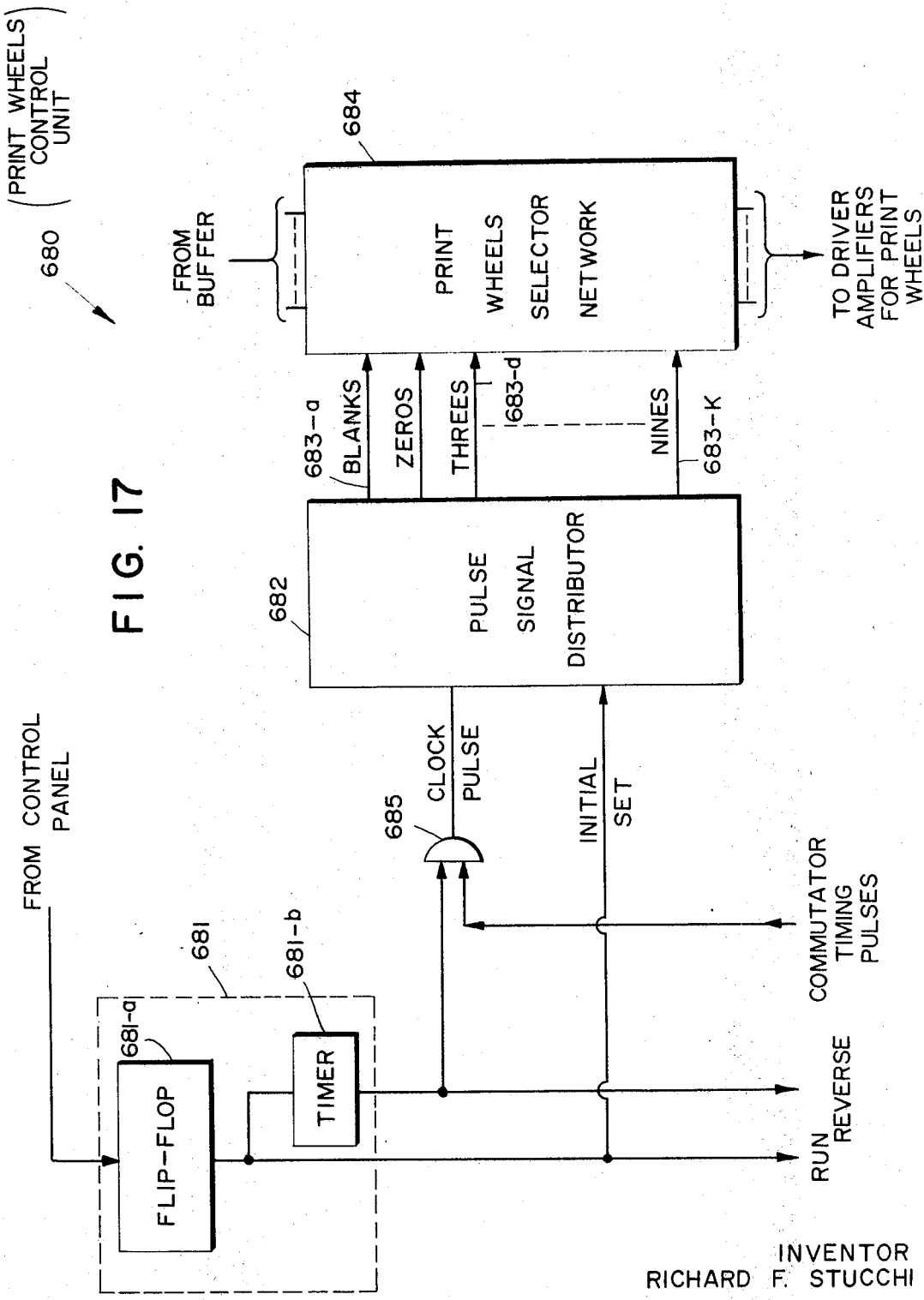
June 30, 1970     R. F. STUCCHI     3,517,612
PRINT WHEEL SETTING AND RESETTING MEANS
Original Filed Nov. 9, 1967     25 Sheets-Sheet 22
INVENTOR
RICHARD F. STUCCHI
BY
*Dike Thompson & Bronstein*
ATTORNEYS

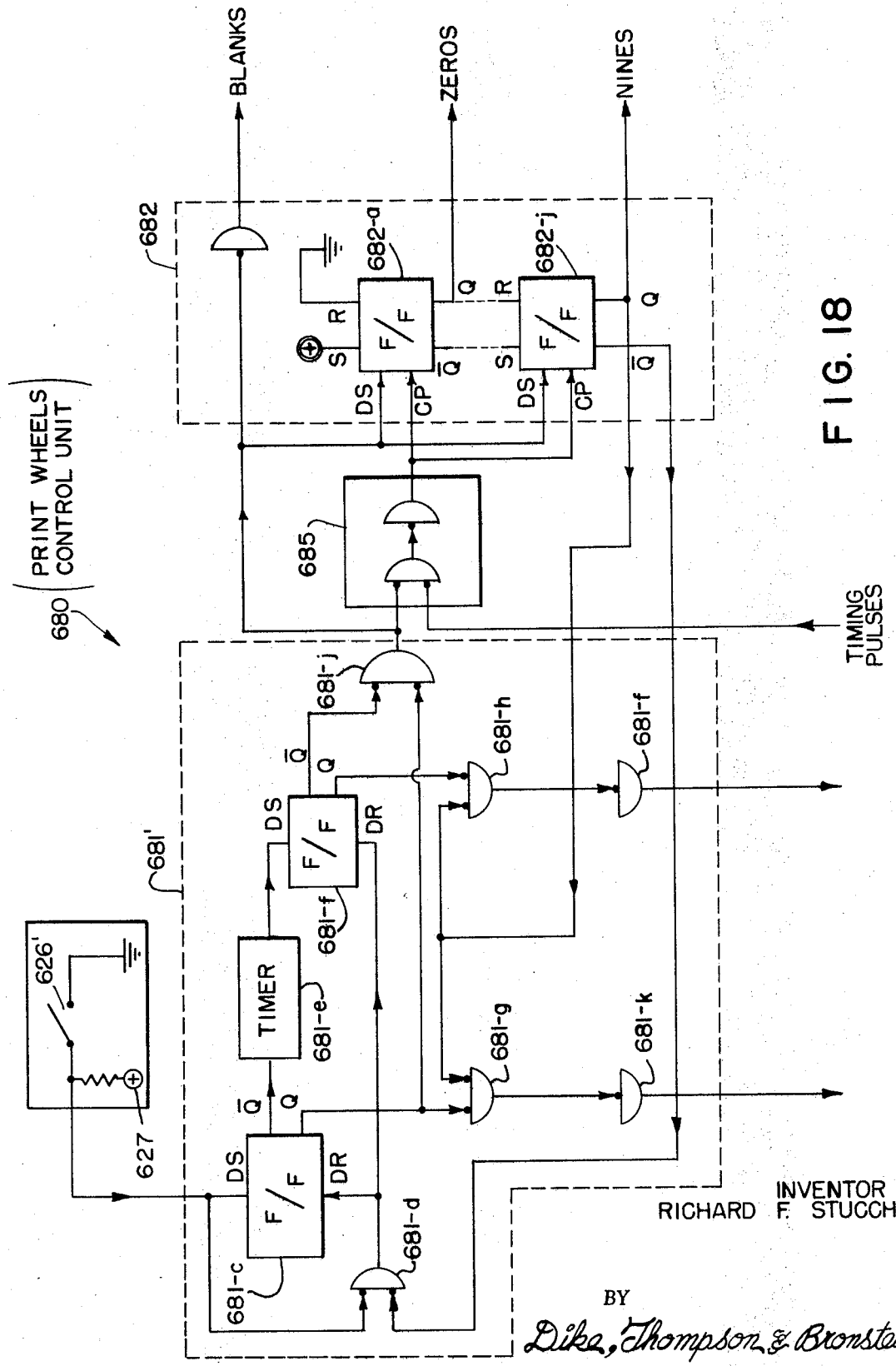

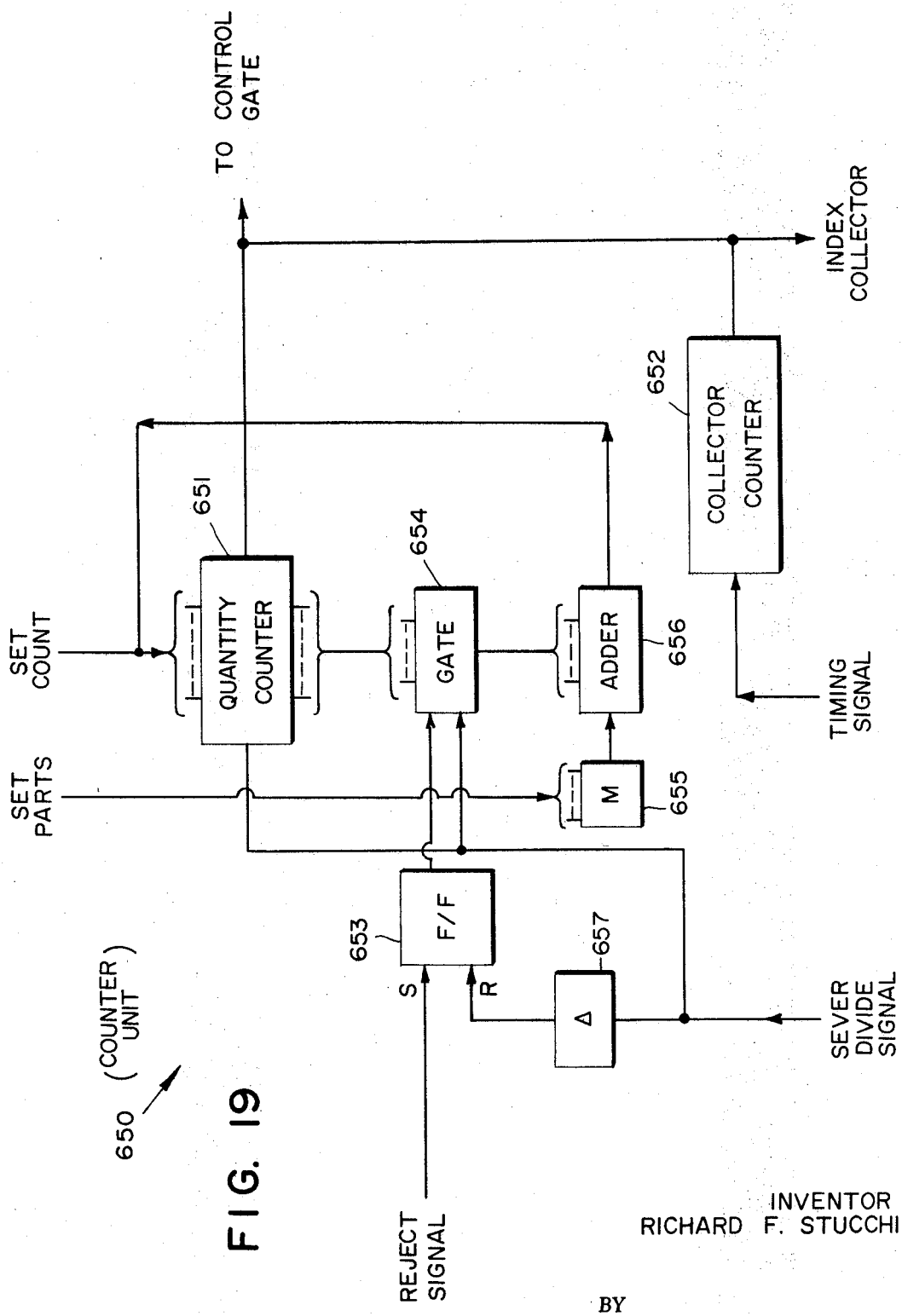

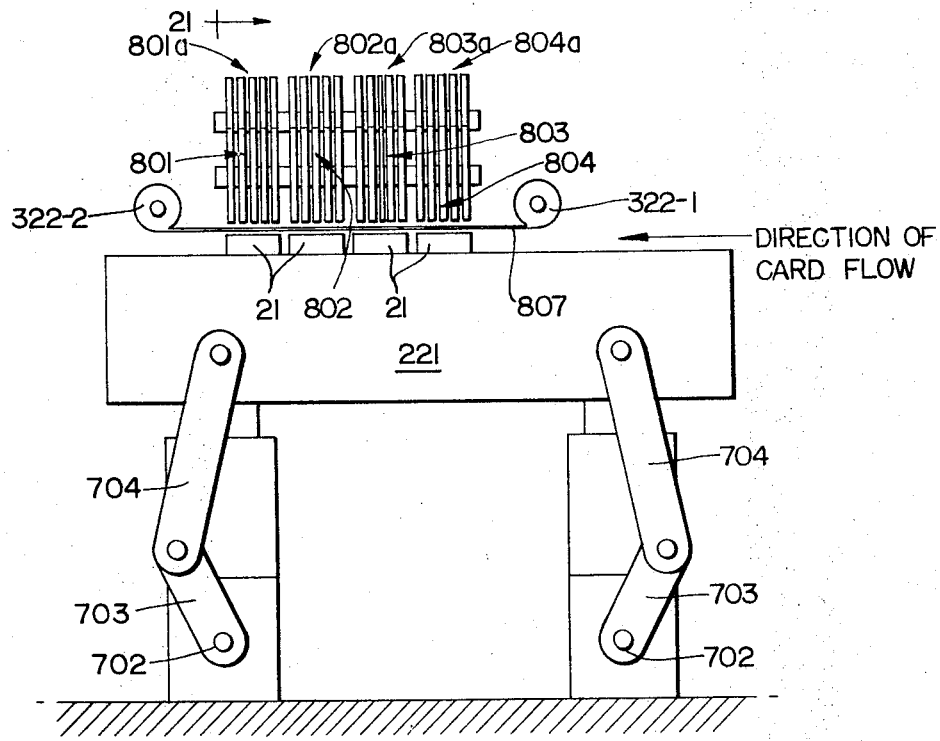
FIG. 20
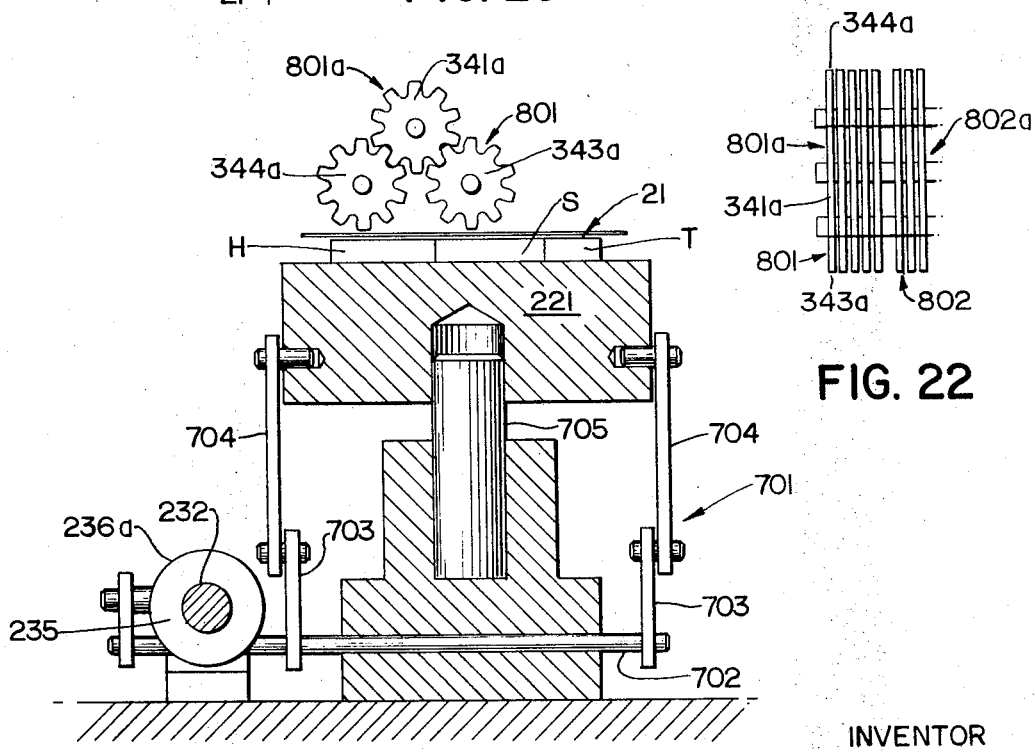
FIG. 21
FIG. 22

United States Patent Office 3,517,612
Patented June 30, 1970

---

3,517,612
PRINT WHEEL SETTING AND RESETTING MEANS
Richard F. Stucchi, Hudson, Mass., assignor to Dennison Manufacturing Company, Framingham, Mass., a corporation of Nevada
Continuation of application Ser. No. 681,831, Nov. 9, 1967. This application Dec. 9, 1968, Ser. No. 787,294
Int. Cl. B41j 7/48, 5/00
U.S. Cl. 101—99                 13 Claims

ABSTRACT OF THE DISCLOSURE

A print wheel assembly including a print wheel having type characters thereon movable to present a selected character opposite a print point, said assembly having a rotatable shaft, a gear slippedly mounted on said shaft and adapted to be rotated therewith in forward and reverse directions to set and reset said print wheel, first stopping means cooperating with one portion of said gear means to arrest rotating movement thereof in one direction to present the selected type character in print position and second stopping means spaced from said first stopping means in order to arrest gear movement in the other direction to return said print wheel to reset position.

---

This application is a continuation application of my U.S. application Ser. No. 681,831, filed Nov. 9, 1967, now abandoned.

A system for marking both visually interpretable information and non-visually interpretable, but machine readable information on record bearing members, typically control tickets used for merchandise identification, classification and inventory control.

The system employs a marking machine that is capable of being controlled from a remote location in order to specify what is to be marked upon the tickets, as well as such auxiliary information as the number of tickets and the number of parts per ticket. Initially, the specified information is advantageously converted into electrical code signals that act upon the machine and its marking instrumentalities.

As the tickets are fed through the machine, visually interpretable information is imprinted upon each ticket at one marking station and non-visually interpretable, but machine readable information is applied by magnetic recording at another marking station. The recorded information illustratively appears on one side of each ticket, without causing ticket disfiguration; a counterpart of at least a portion of that information is imprinted on the other side of the ticket.

The printing instrumentalities, desirably print wheels, are collectively settable from the remote location. For that purpose the print wheels are driven, upon command, in one direction of rotation to a reset position. They are subsequently driven in the opposite direction of rotation to individual positions which are specified from the remote location.

In the case of magnetic recording, electrical interference between regular machine operations and the entry of recorded information on the tickets is reduced by the use of a timing mechanism. In addition, a linkage mechanism is used for the precise positioning of tickets and for controllably moving a recording unit into position. The correctness of the recorded information is verified at the remote location, and, upon a failure of verification, a reject marking unit is operated at the machine.

Illustratively, the recording takes place using serial signals applied in circular tracks to a coating of magnetic material on each ticket. Alternatively, the recording signals may be applied in parallel and linearly positioned on the coating of each ticket, despite non-linear feed, by coordinating the timing of the recording with the movement of the tickets.

Also disclosed is a unit for applying a color mark to the tickets, as prescribed at the remote location. The completed tickets are received by a collector which is also controllable from the remote location.

Additionally disclosed are various electronic logic networks that are used in the system to facilitate remote control of the machine. One of the networks is a divider which is set with binary code signals from the remote location to specify the number of parts per ticket. Where the number of parts is four or less, the divider takes the form of a gated two-stage register that receives a recurring pulse signal from the machine and produces an output in accordance with the number of parts desired. Another of the networks is a comparator that employs NAND logic for controlling the mechanical position of the color mark unit in accordance with code signals sent from the remote location.

BACKGROUND OF THE INVENTION

This invention relates to the marking of record members and, more particularly, to the marking of control tickets, such as those used for merchandise identification, classification and inventory control.

Frequent use is made of record members which carry control information. Typical examples are the ticketing of merchandise and the control of manufacturing work in process. It is advantageous for such control tickets to have a number of sections. One section can remain with the item for identification; the other sections are detached as needed.

When a detached section carries imprinted information it can be processed manually; however it is advantageous for each detached section to carry machine readable information so that the processing can be automated.

With many control tickets, the machine readable information appears in the form of punched perforations. Such perforations are undesirable. They detract from the appearance of the ticket; they cause confusion; and have to be sufficiently large for correct sensing by ticket reading equipment. As a result, there is a limit to the amount of machine readable information that can be entered on a ticket of specified size.

Accordingly, it is an object of the invention to provide for the entry of machine readable information on a ticket without disfiguration of its structure. Another object is to increase the amount of machine readable information that can be entered upon a ticket of specified size. A further object is to coordinate the entry, on a ticket structure, of visually interpretable information and non-disfiguring machine readable information.

In the case of non-visually interpretable information, the occurrence of an error cannot be detected by physical inspection. Tickets that are erroneously marked could seriously disrupt the subsequent processing of control information.

Accordingly, it is a still further object of the invention to curtail the incidence of error in a system for marking tickets with non-visually interpretable information. A related object is to limit the extent of interference between regular machine instrumentalities and those used in imparting non-visually interpretable information to a ticket structure. A further object is to promote the proper positioning of tickets in a marking machine.

The information entered on a ticket structure by a marking machine is ordinarily set by the manual manipulation of various keys and dials. This can be tedious and fatiguing for an operator and lead to setting errors. When the amount of information to be set is extensive, as is typically the case in modern merchandising and inventory control, the possibility of error is increased. In addition, because of the numerous variations characterizing even modest inventories, the length of the average ticket marking run is likely to be short, with the machine being reset at the end of each different run. Where the number of runs is large, the cumulative time that is expended in making frequent changes of setting can become appreciable. Another consideration is that the marking information generally originates away from the machine site. The result is further delay and likelihood of error between the time the information becomes available and the time that it is actually set on the machine.

Accordingly, it is another object of the invention to facilitate the setting of a marking machine with control information. Still another object is to permit the information to be specified at a location that is remote from the site of the marking machine.

Once the information to be printed has been specified, it is advantageous for the corresponding marking instrumentalities of the machine to be set collectively. This reduces the amount of time expended in each setting operation. Even when accomplished directly at the machine site, the collective setting of print wheels generally involves components of considerable bulk and mechanical complexity. Where the print wheels are to be set remotely, the problems of structural bulk and complexity are increased.

Accordingly, it is a still further object of the invention to expedite the setting of printing instrumentalities in a marking machine. Another object is to expedite the remote setting of print wheels. A related object is to reduce the bulk and mechanical complexity of structure for the collective setting of print wheels.

In addition to printing, other forms of visual marking are often desirable on a ticket structure. For example, selective tickets may have a color mark to indicate the category of the associated item or a change in the information originally marked. For flexibility in color marking, the number of different colors should be appreciable.

Accordingly, it is a further object of the invention to provide further forms of marking. Another object is to facilitate the use of auxiliary marking units having a wide variety of operating positions. Still another object is to achieve remote control over the setting and positioning of auxiliary marking units.

In addition to the information that is marked on the ticket structure, it is desirable to specify other matters at the remote location, such as various control operations, the number of tickets to be marked and the number of parts in each ticket. In doing so, account must be taken of the fact that many of the ultimate operations of a marking machine are mechanical in nature.

Accordingly, it is a still further object of the invention to facilitate the exercise of remotely specified control functions at a marking machine. A related object is to achieve circuitry which can act as an intermediary between electrical code signals corresponding to information specified at a remote location and the mechanical components of a marking machine.

SUMMARY OF THE INVENTION

In accomplishing the foregoing and related objects, the invention provides for the marking of record members by machine instrumentalities which are controlled from a preferably remote location by electrical signals. The latter can be used to specify a multiplicity of kinds of information to be marked upon the record members, typically single or multiple control tickets, as well as exercise various control functions. The use of electrical signals facilitates both the non-manual setting of the marking instrumentalities and the operation of those instrumentalities from a remote location.

The marking instrumentalities are desirably used for entering both visually interpretable information and non-visually interpretable machine readable information on respective forward and reverse surfaces of single or multiple control tickets. Illustratively, the visually interpretable information is entered by advancing the control tickets to a printing station of the machine, while the non-visually interpretable and machine readable information is entered, without disfiguration of the ticket structure, at a magnetic recording station. It is by virtue of the magnetic recording that the amount of machine readable information entered upon a control ticket of specified size can be enhanced.

The multiple kinds of information entered upon a ticket structure may be counterparts of each other, of the same or different content, or may have separate sources. Thus, the recorded information may be of greater content than its imprinted counterpart, with the latter including, for example, only titles and headings which are needed to expedite identification and visual spot checking.

To facilitate the coordination of printing and magnetic recording, printing instrumentalities are advantageously in the vicinity of one surface of the control tickets, while a recording instrumentality is in the vicinity of the other surface of each control ticket. In addition, it is advantageous for printing to take place on at least two sections of the ticket, one section of which has magnetically recorded information. During use of the control tickets, the recorded and imprinted sections are detached for control purposes. A section bearing only imprinted information can remain for identification.

In accordance with one aspect of the invention, the printing instrumentalities can be set from a remote location by being driven in one direction of motion to a reset position and, thereafter, in the opposite direction of motion to a set position. This allows the printing instrumentalities to be set collectively. The printing instrumentalities are advantageously positioned at the reset position by a fixed stop which causes their movement to be arrested at a prescribed position.

In addition, it is desirable for the printing instrumentalities to take the form of rotatable print wheels that are selectively engraved with marking characters. Each wheel is driven by a meshing setting gear. The fixed stop engages projections on either the print wheels or on the setting gears when the print wheels reach their prescribed positions. Alternatively, the motion of the print wheels can be arrested by using filled teeth on the print wheels. The motion of each such wheel is terminated when its setting gear encounters a filled tooth.

To position the print wheels at their prescribed setting positions, the setting gears are timed from signals generated during the movement of the print wheels and coordinated with setting information at the remote location. When there is a coincidence between a timing pulse signal and a corresponding setting signal, the associated setting gear is locked in position, preferably by deactuating a previously actuated solenoid associated with the setting gear. Deactuation causes an arm of the solenoid to fixedly engage the setting gear. By the use of setting gears, more than one print wheel can be set at a time. This allows the concurrent setting of characters to be imprinted upon different lines of each control ticket.

In accordance with a further aspect of the invention the operation of magnetic recording is timed from the machine at intervals which are designed to minimize electrical interference with recording by other machine operations. For that purpose the mechanism used to advance the tickets from one station to another can drive a set of apertured discs which actuate photoelectric cells at different portions of each machine cycle. Because of the fixed relationship between the plates, the timing signals generated in this fashion cannot drift and inadvertently cause overlap of recording with other machine operations.

The foregoing kind of timing is particularly desirable with circular recording. In addition, linear recording may be employed, despite any non-linearity in the feed motion of the machine, by the use of a slotted timing plate attached to the feed machanism.

In accordance with still a further aspect of the invention, provision is made for facilitating the proper positioning of tickets at a specified marking station, such as the recording station. This is accomplished by a linkage mechanism which operates from the drive shaft and relieves tension on gripping fingers that otherwise hold the tickets in place. The recording unit is advantageously moved into position just before recording is to take place. This serves to reduce the incidence of wear on the heads of the recording unit. The housing of the recording unit can include a locating station. In addition, the recording unit itself desirably includes a locating pin, such as a spindle, which enters another aperture of the ticket. By virtue of the use of two locating pins, while ticket tension is relieved, the position of the ticket at the recording station is precisely fixed before recording takes place.

In accordance with still a further aspect of the invention, the information which is recorded upon a ticket is specified at a remote location and is verified there by having a reading operation follow each writing operation. When there is a failure of verification, a signal is generated to operate a reject marking unit at the machine.

In accordance with a still further aspect of the invention a mechanism is provided for applying color marks to the tickets. The color mark unit is desirably controlled from the remote location and illustratively includes a rotatable housing with different containers of marking fluid. A motor drives the carousel to a specified position upon command. In order to facilitate the remote control of the color mark unit, a logic network is employed to compare signals generated by cams mounted on the color unit and signals set from a remote location to specify a desired color mark. The color mark units rotates until a comparision is attained, with the mechanism for advancing the tickets being disabled in the meantime to prevent ticket smear. The circuitry for achieving the comparison advantageously takes the form of logic gates by which a direct signal from one source is compared with the inverse of the corresponding signal from the other source, so that two gates are required for each pair of signals being compared. The gates desirably are one of the NAND variety.

In accordance with a still further aspect of the invention a collector, which is indexed from a remote location, is provided for receiving the completed control tickets.

According to yet another aspect of the invention, the control tickets may be severed from stock material in accordance with the number of parts desired for each ticket, as specifiable at a remote location. The circuitry for controlling the sever uses cyclic timing signals from the machine and ilustratively forms an electronic divider. The driver desirably uses a gated, $n$-stage register, where $n$ represents the power to which the binary base digit 2 must be raised in order to specify the maximum number of ticket parts.

BRIEF DESCRIPTION OF THE DRAWINGS

Other aspects of the invention will become apparent after considering several illustrative embodiments, taken in conjunction with the drawings in which:

FIGS. 1 through 3 are general views illustrating a ticket marking system in accordance with the invention as follows:

FIG. 1 is an overall perspective view of the marking system;

FIG. 1A is a plan view of the front side of a multiple ticket produced by the system of FIG. 1;

FIG. 1B is a plan view of the reverse side of the ticket of FIG. 1A;

FIG. 2 is a key to the general block diagram of the marking system of FIG. 1, as set forth in FIGS. 2A through 2C; and FIG. 3 is a perspective view illustrating ticket feed in the marking system of FIG. 1.

FIGS. 4 through 11 are views of the machine portion of the system and its constituents as follows:

FIG. 4 is a perspective view of the marking machine with its cover removed;

FIGS. 4A and 4B are graphs illustrating ticket feed and bed movement in the machine of FIG. 4;

FIG. 5 is a perspective rear view of the machine of FIG. 4;

FIG. 6 is a perspective view of timing signal generators in the machine of FIG. 4;

FIG. 7 is a partial perspective view of a recording head and associated control linkages for the machine of FIG. 4;

FIG. 8 is a fragmentary perspective view of an alternative timing mechanism for controlling magnetic recording in the machine of FIG. 4;

FIG. 9 is an end view showing the output side of the machine of FIG. 5;

FIG. 10 is a fragmentary perspective view of a portion of a print head for the machine of FIG. 4;

FIGS. 10A and 10B are diagrams of alternative print wheels for the machine of FIG. 4;

FIG. 11 is a fragmentary perspective view of a color mark unit for the machine of FIG. 4; and FIGS. 12 through 15 are views of constituents for the interface portion of a ticket marking system in accordance with the invention as follows:

FIG. 12 is a block and a schematic diagram of a sever divide network for the system of FIG. 1 and the interface of FIG. 2B;

FIG. 13 is a block and schematic diagram of an illustrative color comparator for the system of FIG. 1 and the interface of FIG. 2B;

FIG. 13A is a diagram illustrating the operation of cam segments used with the color comparator of FIG. 13.

FIG. 14 is a schematic diagram of a control relay switching network and a color unit switching network for the interface of FIG. 2B; and FIG. 15 is a schematic diagram of a print head switching network for the interface of FIG. 2B.

FIGS. 16 through 19 are views of constituents for the controller portion of a ticket marking system in accordance with the invention as follows:

FIG. 16 is a block diagram of a recording control unit for the controller of FIG. 2A;

FIG. 17 is a block diagram of a print wheels control unit for the controller of FIG. 2A;

FIG. 18 is a block diagram of an alternative print wheels control unit for the controller of FIG. 2A;

FIG. 19 is a block diagram of a counter unit for the controller of FIG. 2A.

FIG. 20 is a side view, partially in diagrammatic form, showing the location of the print means, the ticket, and the mechanism for moving the bed of the marking system; and FIG. 21 is a sectional view, partially in diagrammatic form, taken along line 21—21 of FIG. 20.

FIG. 22 is a top plan view of the print wheels and setting gears according to the invention.

DESCRIPTION OF THE PREFERRED EMBODIMENTS

Figure 2B:
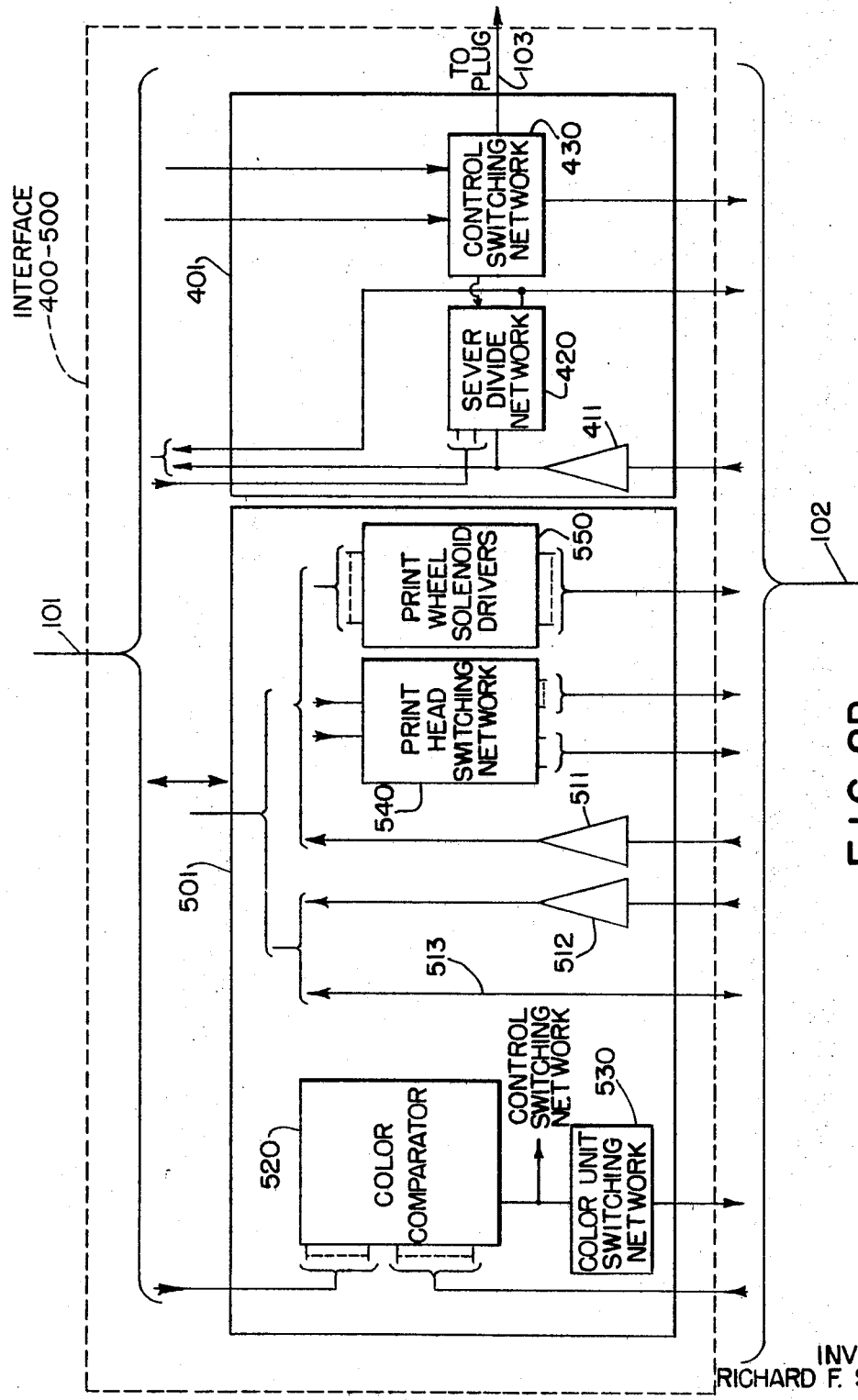

Turning to the drawings, an overall marking system 100 in accordance with the invention is illustrated in FIG. 1 as formed by three units: a marking machine 200–300, an interface 400–500 and a controller 600.

The machine 200–300 is capable of being operated remotely from the controller 600 by electrical signals sent over a connecting cable 101, through the interface 400–500, and over a connecting cable 102 in order to produce single or multiple control tickets from a stock 20 of ticket material in a supply bin 210. Power for the machine 200–300 is supplied from the interface 400–500 through a cable 103; the controller 600 is powered separately through a cable 104.

The stock 20 of ticket material is fed through the machine 200–300 over the bed of a feed mechanism 220 and subjected to selected operations. The latter includes the marking operations of printing and magnetic recording, following which completed tickets enter the hoppers 311 of a collector 310.

A representative multiple ticket 21 produced by the system 100 of FIG. 1 is shown in front and reverse views by FIGS. 1A and 1B, respectively. The ticket 21 is multi-part with two-parts 21–1 and 21–2 joined together by narrow land areas 22. In addition, each part 21–1 or 21–2 is multiplex with a triplex of a header h, stub s and tab t.

The front surface of the ticket 21 (FIG. 1A), which is illustratively used in merchandising, is imprinted by instrumentalities in a print head 320 of the marking machine 200–300 with information such as (1) catalog number, (2) size, (3) color, etc. The reverse surface (FIG. 1B) bears a coating 23 of magnetizable material for receiving code signal counterparts of the imprinted merchandizing information. The code signals are applied by a recording head (not visible in FIG. 1) positioned within the marking machine 200–300 below the bed of the feed mechanism 220.

The only apertures in the ticket structure 21 of FIGS. 1A and 1B are centering holes 24 for positioning the ticket with respect to the recording head and string holes 25 by which the ticket 21 can be attached to an item of merchandise, such as a garment. Accordingly, the resulting ticket is not disfigured by randomly appearing punch marks of the kind characterizing other marking systems.

The merchandizing information marked on the ticket 21 of FIGS. 1A and 1B is specified at the controller 600 of FIG. 1. Illustratively, that information, as well as other control information, is precoded on punched cards 610 which are read by suitable units within the controller 600. Other control signals can be established by operating selected switches of a control panel 620.

Information and control signals from the controller 600 are sent to or through the interface 400–500. The signals that terminate at the interface 400–500 are converted to a form suitable for operating relays and drive motors at the machine 200–300. For that purpose the interface 400–500 contains a number of banks of printed circuit cards, of which one such card 410 has been partially withdrawn from an intermediate bank.

The particular interface unit of FIG. 1 is intended for storage within the base 201 of the marking machine 200–300, as indicated by the dashed-line arrow. The interface 400–500 could alternatively be located in or near the controller 600. When the controller 600 is intended for a remote location it is desirable for the equipment at the actual marking location to be adaptable to other kinds of remote controllers, such as a unit permitting the manual setting or marking indicia, or a general purpose computer. Consequently, the interface 400–500 can also be regarded as a conversion unit to enable input signals to be applied from a wide variety of control equipment.

In addition to signals from the controller 600, the interface 400–500 also accommodates signals from the machine 200–300, some of which are used at the interface, while others are channeled directly to the controller 600.

(I) General block diagram consideration of the system

General constituents of the various units 200–300, 400–500 and 600 of FIG. 1 are outlined by the block diagram of respective FIGS. 2A through 2C of FIG. 2.

At the controller 600 (FIG. 2A) the information carried by the punched cards 610 specifies (1) the number of tickets to be marked; (2) the number of parts in each ticket; (3) the color of any desired color mark; and (4) the information to be printed and recorded. This information is converted into coded electrical form by a card reader 640.

Signals from the card reader 640 corresponding to the first three categories of the input information respectively enter (1) a counter unit 650 of the controller 600 in order to specify ticket quantity; (2) a sever divide network 420 in the control portion 401 of the interface 400–500 (FIG. 2B) in order to specify the number of parts per ticket; and (3) a color comparator 520 in the information setting portion 501 of the interface 400–500 in order to specify the desired color mark. Signals from the fourth category of information, indicating what is to be printed and recorded, enter the storage register of a signal distributor 660 in the controller 600.

The signals stored at the distributor 660 are used for setting the printing instrumentalities of the machine 200–300 (FIG. 2C) before ticket feed commences and for magnetic recording and reading during feed.

To set the printing instrumentalities, a switch is operated at the control panel 620. This actuates a drive motor 321 at the print head 320 of the machine 200–300 through relays 540 at the interface 400–500. Operation of the drive motor 321 produces timing signals which are transmitted through an amplifier 511 of the interface 400–500 to the controller. The timing signals indicate when the printing instrumentalities are at various positions, and act with the stored information of the distributor 660 to control setting solenoids at the machine 200–300 through solenoid drivers 550.

Once the print head has been set, the machine is placed in operation by pressing "start," "run" and "feed" buttons at the panel 620. These buttons activate relays of a switching network 430 in the interface 400–500. The relays in turn control run and feed solenoids at the machine 200–300.

In the machine 200–300, the feed bed can be considered as having three consecutive portions 221–1, 221–2, 221–3, each including a number of stations that are individually the width of one ticket part, e.g. the width of ticket part 21–1 or 21–2 shown in FIGS. 1A and 1B. The sections 221–1, 221–2 and 221–3 are respectively devoted to (1) control operations, (2) printing operations and (3) other marking operations. For the particular embodiment of FIG. 2, the ticket parts from the supply 210 remain joined together by land areas until they reach a sever assembly 240 between the control section 221–1 and the printing section 221–2.

Station-by-station movement of ticket parts over the feed bed 221–1 through 221–3 is illustrated by the progression of ticket parts indicated in the direction of the solid arrows in FIG. 3. The progression is continuous except at either the beginning or the end of a ticket marking run. The various ticket groupings shown in FIG. 3 correspond to the bed portions 221–1 through 221–3 of FIG. 2.

Over the control portion 221–1 of the bed, adjoining ticket parts are interconnected by narrow land areas, as is the stock 20 at the supply source 210. Ticket feed over the bed is initiated by a central feed finger 222 and edge pawls 223. Other edge pawls 223, of which only representative ones are shown, are present at each station over the marking portions 221–2 and 221–3 of the machine bed.

Between the control section 221–1 and the printing section 221–2 the sever mechanism 240 is selectively operated to cut the land areas joining the ticket parts. Illustratively, the sever mechanism 240 is operated by the divider network 420. The latter receives a timing pulse from a timing mechanism 250 through an amplifier 411 each time a ticket is advanced along the bed of the machine. Thus, if the divider network 420 is set to divide by three, i.e. produce an output pulse for each three input pulses, the result is a three-part ticket shown illustratively in FIG. 3 at the printing grouping 221–2 and at the other marking ticket grouping 221–3.

Beginning with the printing portion of the feed, the stations of FIG. 3 are numbered sequentially from 1 through 16. Printing takes place simultaneously on the header and the remainder of each ticket part, one line at a time, at stations 3, 5, 7 and 9. These printing stations are respectively for the first or top line, the second line, the third line, and the fourth or bottom line.

The printing instrumentalities are set from the controller 600 through the interface 400–500, making use of timing signals from the machine 200–300.

The set of stations following printing, namely stations 10 through 16, is devoted to other kinds of marking operations. The first such marking operation is at station 13 where each ticket part receives code signals on its underside coating of magnetic material, shown in dotted outline, by a facing recording unit 350 (FIG. 7) under the control of timing signals supplied to the signal distributor 660 from the timing assembly 250 through an amplifier 512. Provision is also made for verifying the recorded information. For that purpose the recorded information is read and compared with the stored information at the controller 600. If there is a failure of comparison, the ticket part is rejected at the next marking station, number 15, by operation of a stamp bearing the letters "VOID" as shown.

The last marking station for the feed depicted in FIG. 3 is at station 16 where a color mark can be imprinted on the ticket part from a setting made by the controller 600. On the next cycle of machine operation, the completed three-part ticket enters a hopper of the collector 310.

(II) Detailed description of the marking machine

Figure 5:
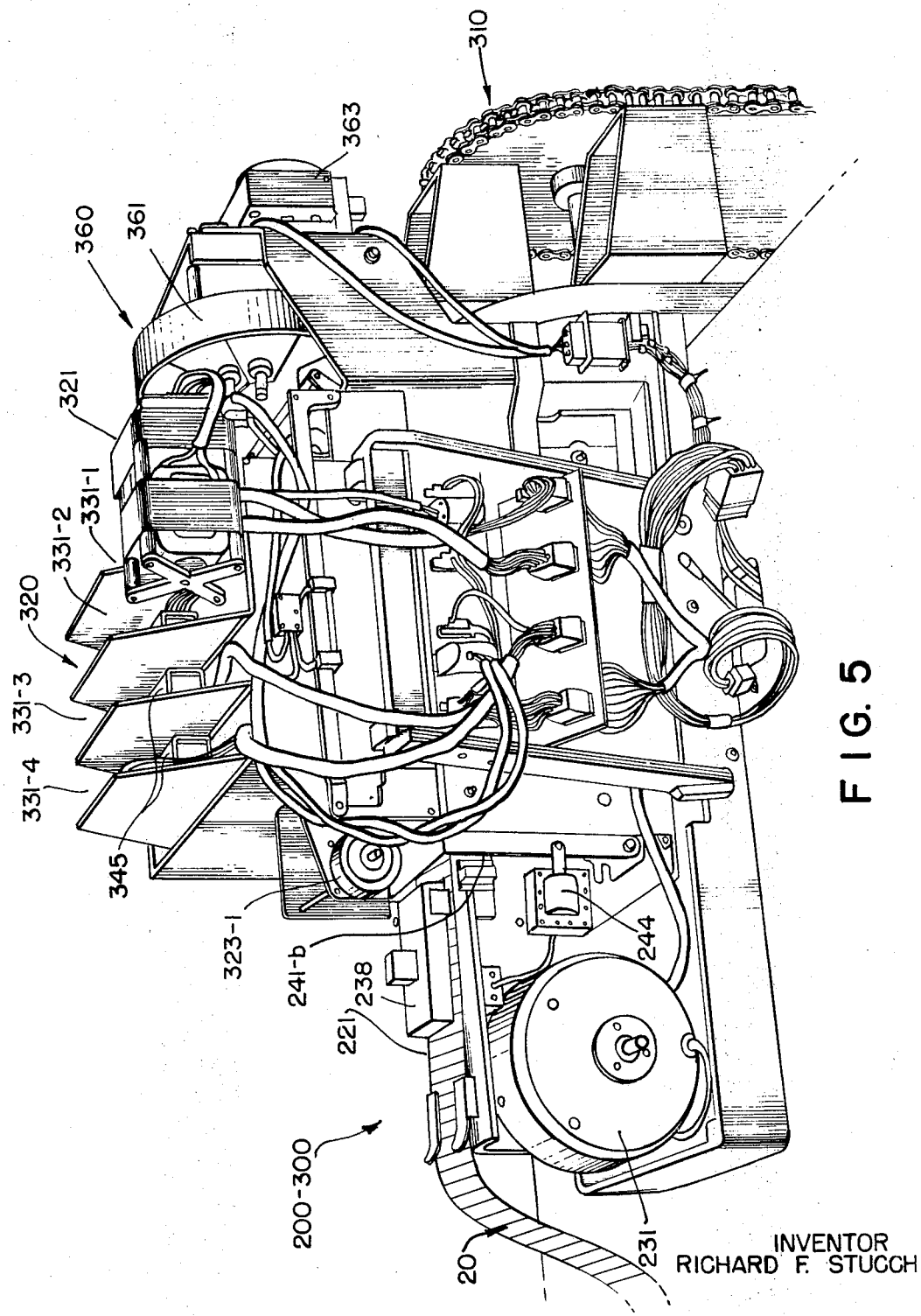

Perspective views of the marking machine 200–300 of FIG. 1, with its cover removed, are set forth in FIGS. 4 and 5, from the front and rear respectively. The base 201 of the machine serves as a cabinet for the interface unit 400–500 (FIG. 1).

Mounted above the base 201 is the bed and feed mechanism 220. The mechanism 220 is an adaptation of similar structure disclosed in detail by U.S. Pat. 2,890,650 which issued to A. R. Bone et al. on June 16, 1959.

In addition to the bed and feed mechanism 220, the machine 200–300 includes (1) a print head module 320, shown in its hinged opened position above the bed 221 in the front view FIG. 4 and in its hinged closed position in the rear view of FIG. 5; (2) recording unit 350 positioned beneath the bed 221 near its output end; (3) a rotatable color mark unit 360 mounted above the bed 221 beyond the recording unit 350 and (5) an indexible collector 310 for completed tickets at the output end of the bed 221.

During operation of the bed and feed mechanism 220, a drive motor 231 produces rotation of a drive shaft 232 (FIG. 4) through a clutch 233. Each rotation of the drive shaft 232 constitutes a feed and marking cycle of the machine.

Actuation of the clutch 233 to bring about the operation of the drive shaft 232 is through a run solenoid gun 234–a which couples the drive gear of motor 231 to a driven gear of the shaft 242. Details of this clutch mechanism are disclosed in the Bone patent referenced above.

The drive shaft 232 includes a cam 235 (FIG. 4) for operating a slide (not visible in FIG. 4) beneath the bed 221 to which the ticket feed pawls 223 (FIG. 3) are attached. The slide and the attachment of the feed pawls 223 are similar to what is disclosed in the Bone patent.

Once the pawls are operative, they are brought into contact with the stock 20 of ticket material by actuation of a feed solenoid 234–b which brings about the lowering of a lift finger, of the kind disclosed in the Bone patent, to bring the tickets into engagement with the feed pawls. This engagement is promoted by the use of a weight 238 above the bed. At the end of a ticket run, the solenoid 234–b is deactivated so that the lift finger can rise through an aperture of the bed and lift the stock out of contact with the bed pawls.

The feed pawls reciprocate longitudinally. This motion advances the ticket material by one station per cycle as shown graphically in FIG. 4A. During approximately the first 60° of drive shaft rotation, the feed pawls engage the edgewise feed slots of the ticket parts (FIG. 3) and move forwardly to carry the ticket part to the next station. The feed pawls dwell at the next station for about 20°, following which there is a return movement. The feed pawls then dwell at the return station for about 220° until the next operating cycle.

Besides the cam 235, the bed mechanism includes additional cams 236–a and 236–b, see FIGS. 4, 20, and 21 which operate through followers 701 (only one is shown in FIGS. 20 and 21) to rock shafts 702, which shafts are connected by toggles 703 and 704 to lift and lower the bed 221. In addition there are provided pins 705 (only one of which is shown in FIG. 21) which slide within the bed 221 to guide the bed 221 during its up and down motion. A description of the bed reciprocating means disclosed herein is shown in prior art U.S. Pats. Nos. 3,036,520; 2,890,650; 3,095,807, and 2,968,236 all of which are incorporated herein by reference hereto.

The movement corresponding to the motion of cams 236–a and 236–b is illustrated graphically by FIG. 4B. Initially, the feed bed 221 is in its lowermost position. After approximately 30° of dwell at the beginning of each operating cycle, the bed rises harmonically over about 90° of drive shaft rotation. At the end of this movement, the bed has reached its maximum height and the ticket parts at various stations are in full contact with the various printing and marking instrumentalities above the bed. Following the peak of its rise, the bed executes a retrograde return movement for about the next 90° of drive shaft rotation. The bed thereafter dwells at its lowermost position for approximately 150° until the next cycle.

The upward motion of the bed 221 is also important in conjunction with the operation of the sever assembly 240 by which the severing of single or multi-part tickets takes place from the stock 20 of ticket material.

The sever assembly 240 includes pivoted arms 241–a and 241–b, shown respectively in FIGS. 4 and 5. Each arm has a reversed L-shaped aperture that receives a lateral pin of a spring loaded sever bar 242. The bar 242 is slidably mounted with respect to vertical positioning pins (not shown) of a stop bar 243. In the position indicated by FIG. 4, the bar 242 is carried upwardly as the bed rises, with its pins riding in the stem of the inverted L. However, when the arms 241–a and 241–b are pivoted rearwardly by a solenoid 244 (FIG. 5) the pins of the bar 242 move from the stem into the base slot of the inverted L so that the bar is held in place and comes into contact with the ticket material when the bed again moves upwardly. To produce the severing illustrated by FIG. 3, the bar 242 includes punches for the land areas 21. The bar 242 alternatively can include a knife edge that extends from one side to the other of the bed 221.

Besides the cams 235, 236–a, and 236–b the drive shaft 232 includes a timing cam assembly 250 and cams 261 and 271 for linkage assemblies 260 and 270. Cam assembly 250 is used in generating separate timing signals for severing and magnetic recording. Linkage 260 is used to relieve tension on tickets in the vicinity of the recording unit 350. Movement of the recording unit 350 is controlled by linkage assembly 270.

(a) Timing cam assembly

Figure 6:
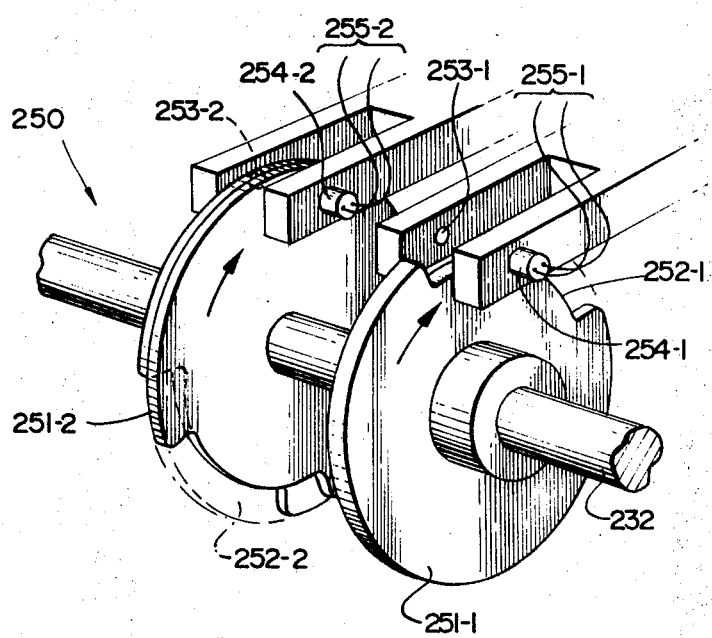

Details of the timing cam assembly 250 are illustrated by the perspective view of FIG. 6. Separate disks 251-1 and 251-2 are provided for general control timing and magnetic recording timing. Each disk includes a peripheral notch 252-1 or 252-2 that permits light from a bracket mounted lamp 253-1 or 253-2 to activate a photocell 254-1 or 254-2 during each notch interval. The positions and aperture openings of the disks 251-1 and 251-2 can be made adjustable. The supply voltage for the lamps 253-1 and 253-2 is applied in conventional fashion. The result, for each revolution of the drive shaft 232, is a control timing pulse signal applied to the interface 400-500 (FIG. 2) over a timing cable 255-1 and a record timing pulse applied over cable 255-2. The timing pulse signals are applied to respective amplifiers 411 and 511 which are of conventional design, desirably mounted on printed circuit boards, such as the board 410 of FIG. 1.

Figure 6A:
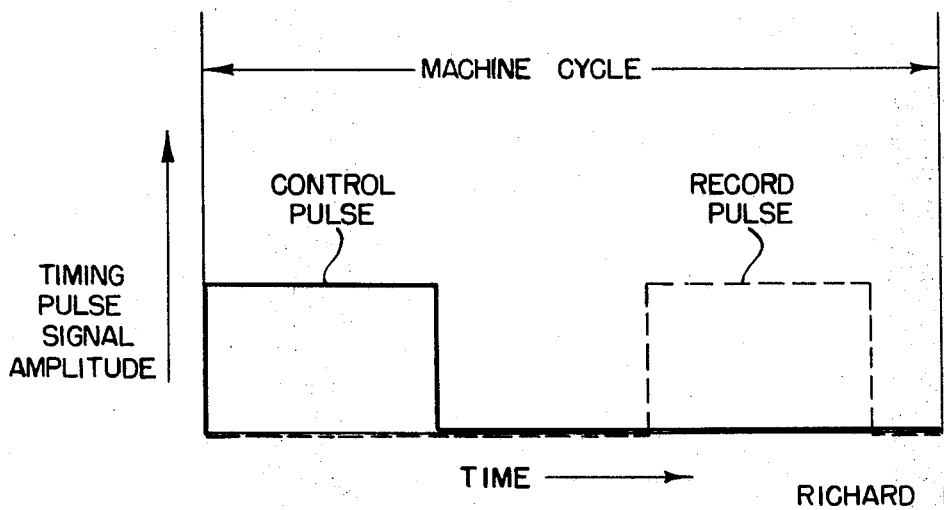
FIG. 6A is a graph of the timing pulse signals produced by the generators of FIG. 6.

Illustrative timing pulse signals are shown in FIG. 6A. In a tested embodiment of the invention the time for each rotation of the drive shaft 232, and hence the machine cycle time, was about 400 milliseconds. The control timing pulse generated by the notch 252-1 appeared at the beginning of each cycle and endured for approximately 120°. Because of the radical displacement of the record timing disk 252-2 with respect to the control timing disk 252-1, there followed an interval of about 100° during which the disks 251-1 and 251-2 blocked their respective photocells and there was no timing output. The record timing pulse was then generated for approximately 120°, leaving a no-output interval of about 20° until the end of the cycle.

As a result of the fixed interval between the different classes of timing pulses, the control operations, i.e. severing and the operation of the control relays, can be timed so as not to occur during recording. Actuation of a control relay invariably produces electrical disturbance effects. If magnetic recording were to take place at that time, there could be electrical interference with the code signals applied at the recording station. The fixed disposition of the timing disks 251-1 and 251-2 with respect to each prevents any such overlap, as could occur because of drift if an electronic delay unit were to be employed.

(b) Linkage assemblies

Figure 7:
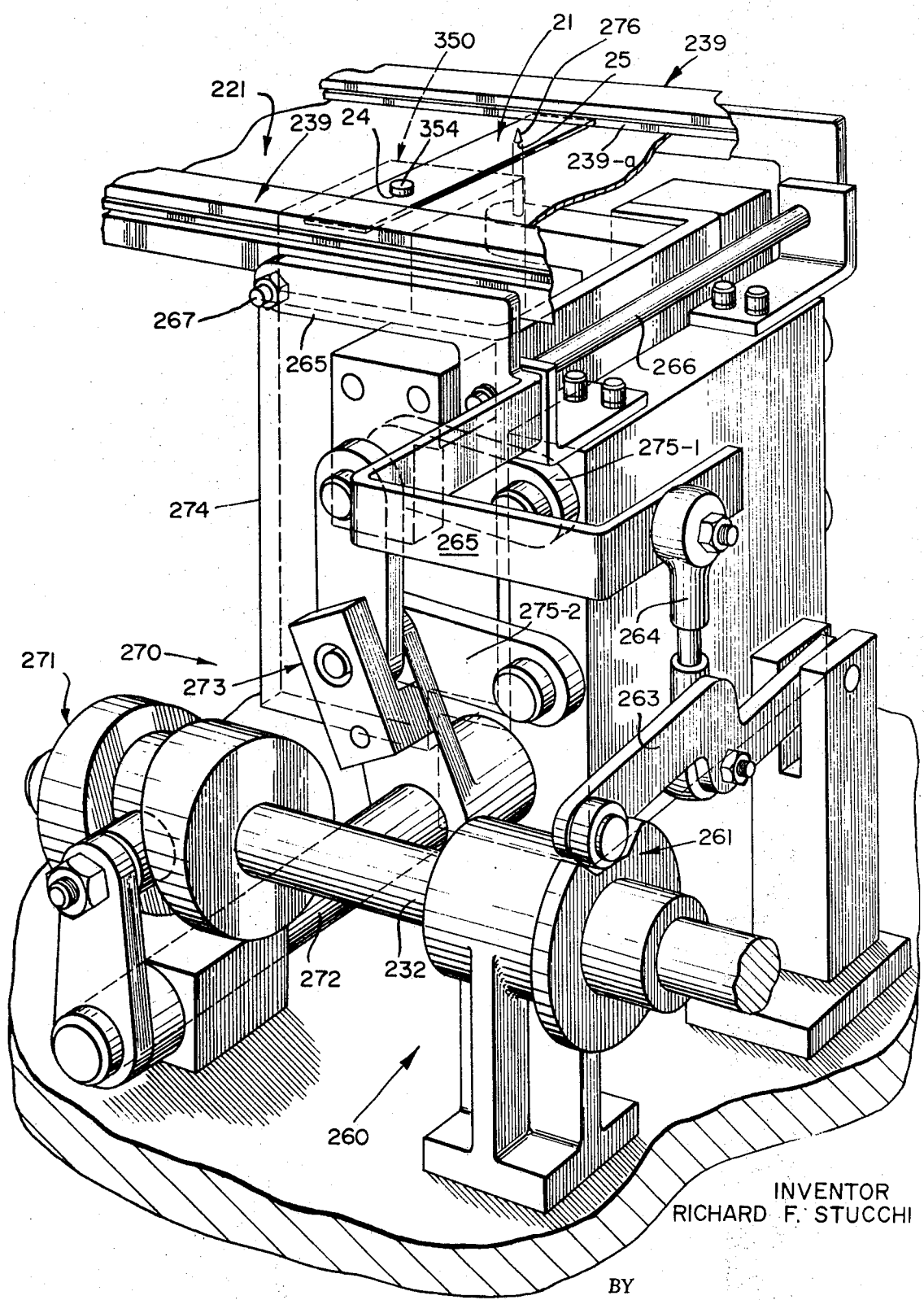

The linkage assemblies 260 and 270 shown in detail by FIG. 7 control the operation of the marking machine in the vicinity of the recording station 13 of FIG. 3.

Both sides of the feed bed 221 on the machine include gripper fingers 239. These fingers serve to hold the ticket parts against the bed, but they have sufficient flexibility to permit ticket advance by the feed pawls. They are in the form of sections that span several stations of the bed.

The pressure exerted on the ticket parts by the gripper fingers 239 in the vicinity of the recording station is relieved by the action of the linkage assembly 260. This permits proper positioning of each ticket before recording takes place.

For the oppositely positioned gripper fingers 239 in the vicinity of the recording station, one of which is shown in FIG. 7, there is a lower spring flange 239-a (FIG. 7A) that extends for the length of the gripper section. The spring flange 239-a is mounted at a downward angle so that an upward component of thrust applied to it will produce an upward movement of the associated finger. The material of the flange 239-a and of the finger 239, the angle between the two, and the point at which the thrust is imparted, determines the relative displacement of the finger with respect to the ticket 21 (FIG. 7A).

Figure 7A:
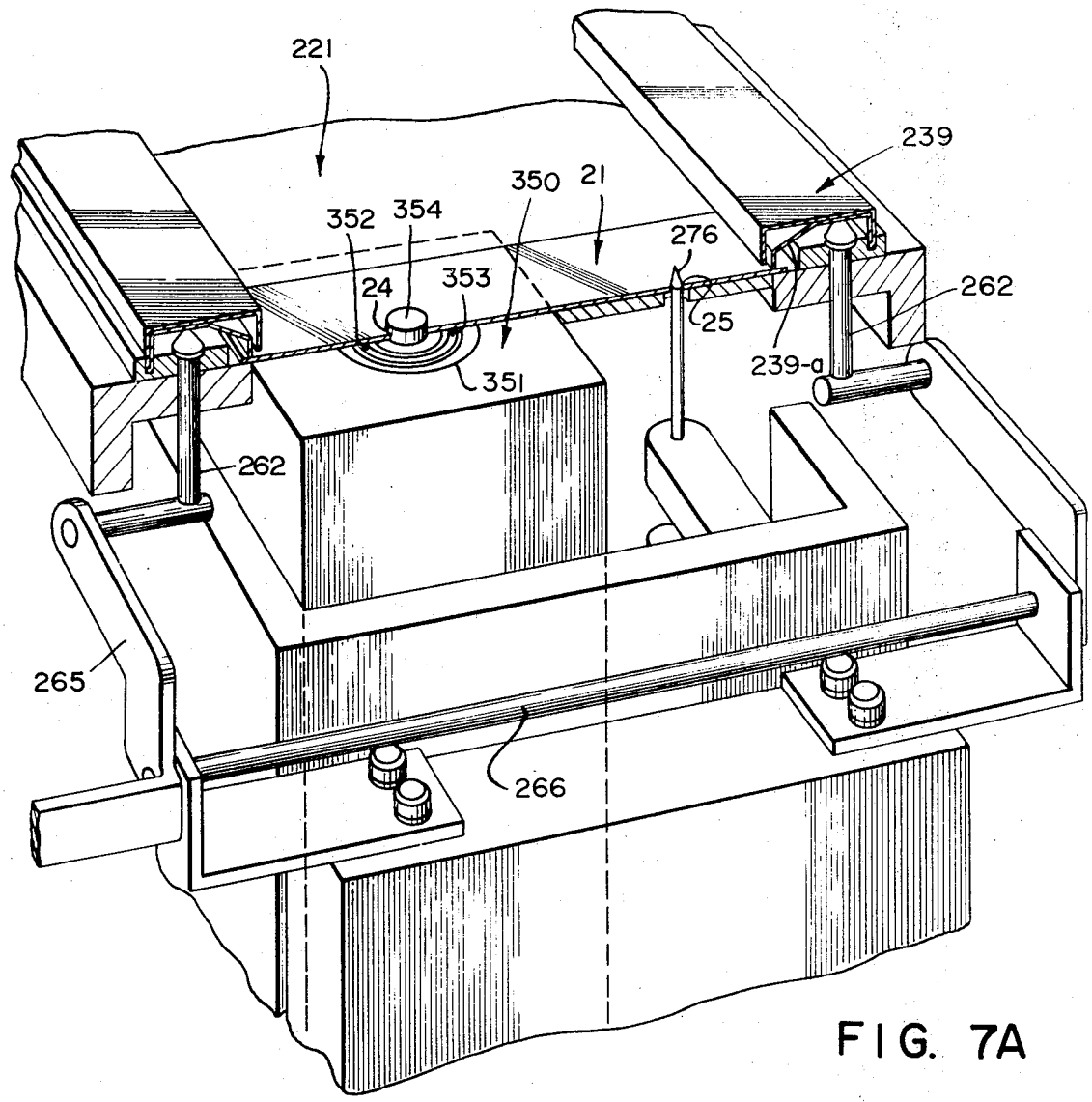
FIG. 7A is a fragmentary view of FIG. 7.

In the embodiment of FIGS. 7 and 7A, upward thrust is imparted to the flange 239-a by a pressure release pin 262, which is operated through the linkage mechanism 260 from the cam 261.

During each rotation of the drive shaft 232 there is a point where the follower of the pivoted arm 263 enters a recess of the cam 261. The resulting downward motion of the arm 263 is transmitted through a linkage 264 to arm 265. The latter is affixed to a roll shaft 266 that is pivotally mounted beneath the bed 221. An extension 267 of the arm 265 acts against the pressure release pin 262. An arm (not shown) on the other side of the bed, similar to the extension 267 and affixed to the roll shaft 266, controls a laterally opposite release pin (not shown). The shape of the arm 265 between the pivot point and the linkage 263 is governed by the structural configuration of the machine.

Figure 7B:
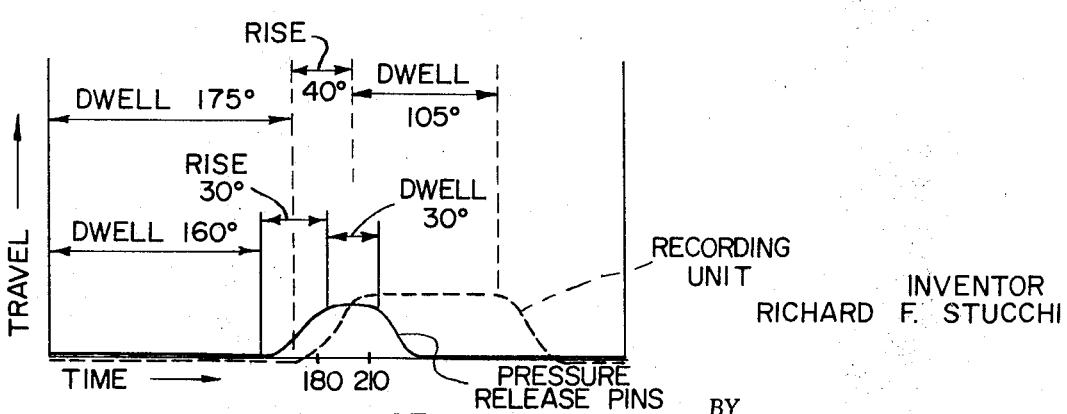
FIG. 7B is a graph illustrating the motion of the linkages of FIG. 7.

That portion of the machine cycle during which the pressure of the gripper fingers 239 is relieved is illustrated graphically by the solid line curve of FIG. 7B. The gripper mechanism dwells for approximately 160° of drive shaft rotation and then causes a rise of the pressure release pin for about 30° followed by a dwell of 30° and a return of 30°. By comparison with the graphs of FIGS. 4A and 4B, it is seen that the pressure is not released until the ticket part has been advanced as far as it will go during the cycle. The pressure remains released for a short interval after the bed has returned to its original position.

While the gripper finger tension is being relieved at the recording station, the unit 350 of FIGS. 7 and 7A is being raised into position, where it remains for the approximate 105° dwell interval indicated by the dashed-line curve of FIG. 7C.

The recording unit 350, as seen in FIG. 7A, is adapted for rotary operation. It has a cylindrical support 351 with two heads 352 and 353 that are of conventional construction and are used for both magnetic reading and writing. The center of the support 351 includes a spring-loaded spindle 354 about which rotation takes place. As a result, the recording pattern on the magnetically coated undersurface of the ticket 21 consists of two concentric tracks, one for each of the heads 352 and 353.

The operation of raising and lowering the unit 350 when a ticket 21 is in position for recording serves to reduce wear on the heads 352 and 353 by the iron oxide of the ticket coating 23. In addition, the transverse movement of the recording unit 350 facilitates the proper positioning of the ticket 21 with respect to the heads 352 and 353 by making use of the spindle 354 for centering.

Control over the transverse movement of the recording unit 350 is by the linkage mechanism 270 which converts the movement of the cam 271 into a swinging rotation of a transverse shaft 272. The latter is connected to a toggle linkage 273 that is pivotally mounted on an L-shaped bracket 274 of the recording unit 350. The bracket 274 is supported for vertical arcuate movement by a pair of linkages 275-1 and 275-2.

In addition to carrying the recording unit 350, the bracket 274 is connected to a mount for a locating pin 276. Consequently, the transverse movement of the locating pin 276 is synchronized with that of the recording unit 350 and enters the string hole 25 of the ticket 21 before the spindle 354 engages the stub hole 24. This fixes the ticket 21 in place and prevents inadvertent movement by virtue of the rotary contact of the moving heads 352 and 353 with the magnetically coated undersurface of the ticket 21.

When the support 351 is in its transversely upward position, and while it is rotating, recording takes place by energizing the heads 352 and 353 from coils (not shown) positioned within the unit 350 and operated from the controller 600. In a subsequent revolution of the support 351, the magnetic field pattern produced in the coating during recording energizes internal coils that are used for reading the recorded information. This allows a comparison to verify the correctness of the recorded information with the signals stored at the distributor 660 (FIG. 2A).

From the curves of FIG. 7B it is seen that the gripper fingers 239 at the recording station return to gripping engagement with the ticket 21 while the unit 350 is in recording position. This creates a clamping effect on the ticket 21 and assists the locating pin 276, as entered into the string hole 25, in preventing inadvertent rotation of ticket 21. The locating pin 276 is convexly tapered from its end to promote proper engagement with the string hole 25.

The recording technique illustrated by the embodiment of FIG. 7 makes use of the fact that the forward feed motion of the pawls has terminated by the time recording is to take place. This kind of recording makes use of a cyclic timing signal, such as that provided by the timing cam assembly 250 (FIG. 6), to gate stored signals from the distributor 660 (FIG. 2A) to the recording unit 350. Where the recording support does not rotate continuously, the timing signal can also control an internal drive motor (not shown).

In place of circular recording, the invention also provides for linear recording by a substitute unit 350' shown in FIG. 8. The substitute unit 350' makes use of a line of recording heads 355-1 through 355-8 for recording one binary code word at a time, followed by a line of reading heads 356-1 through 356-8 for verifying the correctness of what has been recorded. Each head records the electrical counterpart of a binary digit, or bit. There are eight heads in each line to allow for six data bits (to represent up to 64 alphanumeric characters), one party bit (for error checking) and one bit to serve as a clock pulse (for decoding). Where self-clocking is used only seven heads are needed.

The desired timing is obtained using a slide 224 (FIG. 8) that is otherwise used for the feed pawls of the machine. As can be seen from the graph of FIG. 4A the travel of the feed pawls is non-linear. Nevertheless, to facilitate decoding and reduce error, it is desirable for the recorded information to be of uniform density, i.e. linear in the direction of feed.

A linear recording pattern is obtained for the embodiment of FIG. 8, despite the non-linearity of the feed motion, by the use of a slotted timing plate 225. The plate 225 includes a set of slots 226, there being one slot for each code word to be recorded. In addition, there are slots 227-1 and 227-2 to indicate the beginning and the end of each timing interval.

Each set of slots 226 and 227 is used with a photocell circuit 228 or 229. The photocell circuit 228 includes a photocell 228-a that is illuminated from above the plate 225 by a lamp 228-b through a slit plate 228-c. The photocell circuit 229 includes similar constituents 229-a, 229-b and 229-c.

As each slot of the timing plate 225 passes over its associated photocell 228-a or 229-a a pulse is produced. The slits of the plates 228-c and 229-c are narrower than the narrowest slot of the plate. This produces pulse signals with relatively abrupt transitions at their leading and trailing edges and promotes precision in timing.

(c) The print head module

Figure 9:
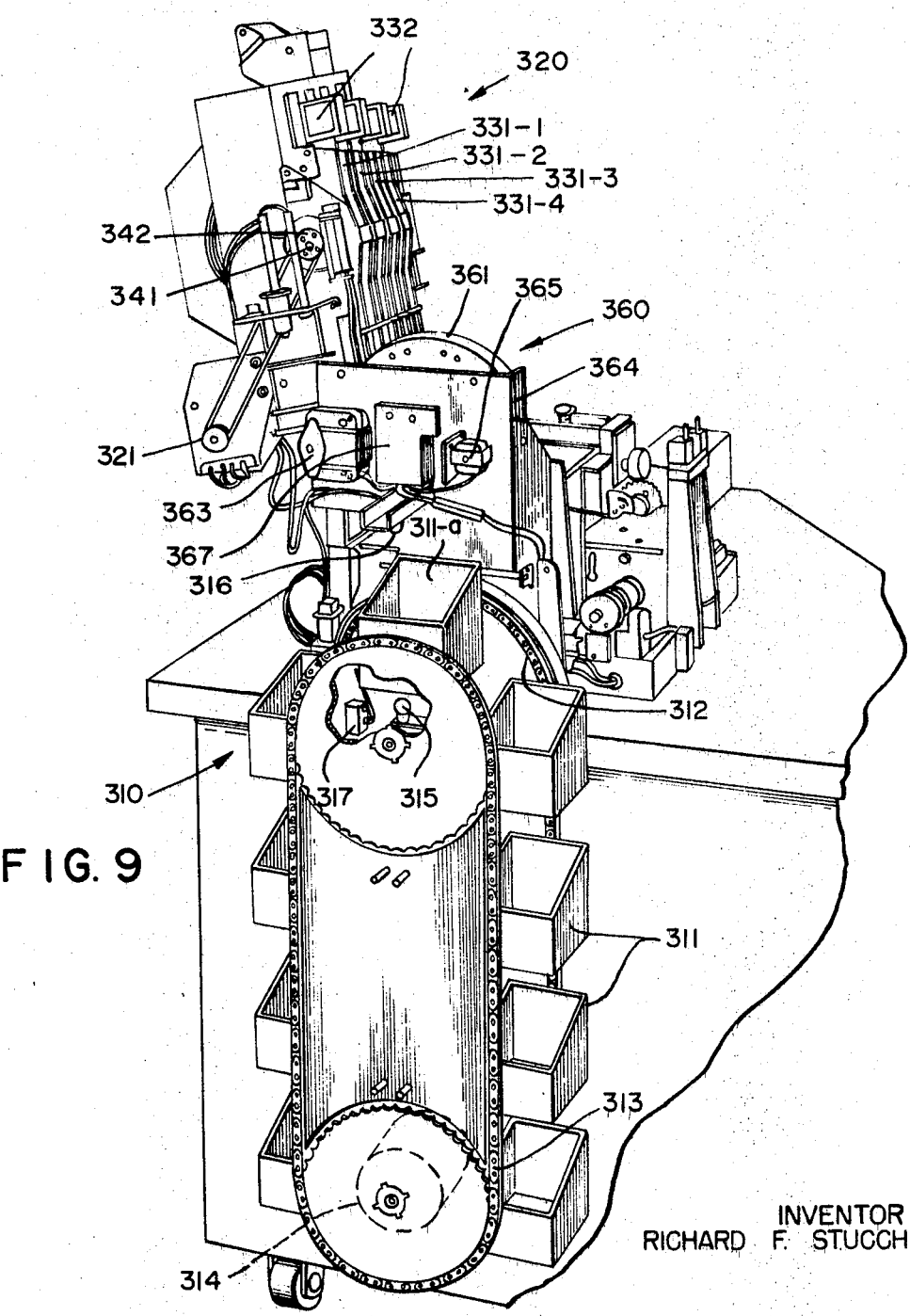

Turning to the details of the print head module 320 of FIGS. 4 and 5, a further view showing its drive motor 321 is given by FIG. 9.

As indicated by FIGS. 4, 5 and 9 the print head module 320 includes four separate bays 331-1 through 331-4, each containing two groups of print wheels. The print wheels of each individual bay are set simultaneously from the controller 600 (FIG. 2A) and are then held in their set positions by solenoid actuated locking bails 332.

The print head module 320 also includes mounting spindles 322-1 and 322-2 (FIG. 4) for a ribbon (not shown) which is advanced by ribbon solenoids 323-1 and 323-2 during each machine cycle. Drive for the ribbon solenoids 323-1 and 323-2 is from the interface 400-500 (FIG. 1) and is discussed below.

As shown by FIGS. 9 and 10, the motor 321 is belted to a setting shaft 341. A commutator disk 342 attached to the shaft 341 is used to generate the print head timing signals shown applied to the distributor 660 of FIG. 2A.

Since the groups of print wheels in adjoining bays 331-1 through 331-4 (FIG. 4) are not axially aligned, conventional gearing is used for transmitting the motion of the setting shaft 341 for the first bay 331-1 successively to the non-axially aligned setting shafts of the other bays 331-2 through 331-4.

Details of print wheel setting are illustrated by the partial perspective view of FIG. 10 for the first bay 331-1. Within the bay 331-1, there are two groups of print wheels on respective shafts 343 and 344, of which, for simplicity, only a pair of selected members 343-a and 344-a are shown. In particular the print wheel 344-a is used to print the right-hand character of the price line on the header $h$ of FIG. 1A, while the print wheel 343-a is used to print the right-hand character on the tab portion of the ticket in FIG. 1A.

For a full complement of print wheels, there are five on each of the shafts 343 and 344, since both the fourth line of printing on the header $h$ and the line of printing on tab $t$ have five numeric characters in the illustrative two-part ticket 21 of FIG. 1A. The other lines have ten characters each and their bays 331-2 through 331-4 contain two sets of ten print wheels each.

The representative print wheels 343-a and 344-a in FIG. 10 have twelve teeth each, the first ten of which are faced with prescribed alphanumeric characters. The eleventh tooth is for a null character, i.e. a blank setting; while the twelfth tooth is for resetting. Since there are ten character positions, any of the ten numbers may be included. Alternatively, some of the characters may be non-numeric and used to imprint color or size. The particular print wheel configuration of FIG. 10 is merely illustrative.

The print wheels 343-a and 344-a are mounted for independent rotation on their respective shafts 343 and 344, being held in place by fixed retaining rings 343-b and 344-b. Consequently, when the wheels are obstructed, their shafts can continue rotating.

Rotation of the print wheel shafts 343 and 344 takes place from the setting shaft 341 through conventional gearing. The print wheels 343-a and 344-a have a setting gear 341-a that is slippably mounted on the setting shaft 341, being in side contact with a spring disk 341-c. As a result, rotation of the setting shaft 341, produces rotation of the setting gear 341-a. It is to be understood that a similarly mounted setting gear is employed with the other print wheels ordinarily found in the bay 331-1.

The teeth of the setting gear 341-a are in mesh with those of the print wheels 343-a and 344-a. In addition, the setting gear 341-a is engaged by an arm 345-a of a setting solenoid 345-1.

Since the setting gear 341-a and the enmeshed print wheels 343-a and 344-a are slippably mounted on their respective shafts, the print wheels cannot rotate if the arm of the solenoid is in place, even though the drive motor 321 is operating and its shafts 343 and 344 are turning.

The setting gear of each other pair of print wheels has such a setting solenoid 345, some of which are visible in FIG. 5.

Accordingly, before the print wheels 343-a and 344-a can be set, the setting solenoid 345-1 is activated to withdraw its arm 345-a from the setting gear 341-a, allowing the latter to rotate with the print wheels 343-a and 344-a.

The setting gear rotates through the teeth of a comb structure 333 that spans the sidewalls (not shown in FIG. 10) of the bay 331-1 and is positioned between the groups of print wheels as indicated in FIG. 4. In addition, the setting gear 341–a includes a stop pin 341–b on one of its teeth. When the stop pin encounters the side of a tooth of the comb 333, rotation of the setting gear 341–a terminates even if the shaft 341 continues to rotate. The location of the pin 341–b is such that when it is stopped by a tooth of the comb 333, the print wheels have null characters, or blanks, in printing position.

During rotation of the setting shaft 341, the commutator disk 342 generates timing signals for the controller 600 of FIG. 2A. The commutator includes apertures 342–a corresponding to the various positions adopted by the print wheels 343–a and 344–a. As the commutator 342 is rotated to permit light from a source 346 to pass through the apertures 342–a, a photocell 347 is energized.

Accordingly, to set the wheels of the print head module 320, each setting solenoid of the module, such as solenoid 345–1 of FIG. 10, is energized to release the associated print wheel setting gear. The setting shaft 341 (FIGS. 9 and 10) is then driven in one direction of rotation by the drive motor 321 until all of the print wheels are returned to their blank positions, i.e. reset.

Subsequently, the direction of rotation of the setting shaft 341 is reversed and the timing signals generated from the commutator 342 are coordinated with the setting information at the controller 600 until, for each pair of print wheels, the number of timing pulses corresponds to the position desired. A setting solenoid is then deactivated to stop the setting gear and the associated print wheels. If more than one pair of print wheels is to be set for the same printing position, their setting gear solenoids are deactivated simultaneously.

When the setting cycle is completed, the solenoids of the locking bales 332 are deactivated to align the print wheels by group and provide further locking.

In the embodiment of FIG. 10, the movement of the print wheels 343–a and 344–a is terminated at their reset position by having the stop pin 341–b of the setting gear 341–a contact a tooth on the comb structure 333. Alternatively, the print wheels can be stopped by having adjoining teeth filled at 341–d, (FIG. 10A) so that rotation of the setting gear cannot continue beyond the reset position. Another alternative is to employ a raised tooth 341–e on each print wheel (FIG. 10B) or on the setting gear. Such a tooth can terminate rotation by contacting another gear or wheel or a stop of the housing.

FIGS. 20 thru 22 show diagrammatically four groups 801–804 of print wheels, normally supported within the bays 331–1 through 331–4 (FIG. 4) as described above. It should be understood that within each bay there are two groups of print wheels in a side by side relationship as described in the description of FIG. 10 such that a line of the head of the ticket 21 may be printed at the same time that a line of the stub or tab of the ticket 21 is printed. In FIG. 20, each group is shown with five print wheels and in addition, there is shown groups 801a–804a of five setting gears each for driving the print wheels of each group or row positioned within each bay. In FIG. 21, there is shown, two print wheels 343a and 344a (see also FIG. 10) of the two groups of print wheels positioned in bay 331–1. Print wheel 343a is one of five print wheels of the group 802 shown in FIG. 20 and positioned in bay 331–1. In FIG. 21 there is also shown a setting gear 341a for positioning the print wheels 343a and 344a as described above. In FIGS. 20–22 the print wheels groups 801–804 as well as the group of setting gears 801a and 804a of adjacent bays 331–1–331–4 are diagrammatically shown for convenience mounted on common shafts, although it should be understood as described with reference to the description of FIG. 10 and as shown in FIG. 4, the print wheels as well as the setting gears of each adjacent bay are not ordinarily axially aligned, but are offset to print on different parts of the ticket and are usually driven by separate shafts conventionally geared to shaft 341 as previously described.

Referring again to FIGS. 20 and 21, the ticket is shown at 21 and includes a head (h), stub (s) and tab (t). In FIG. 20 the tickets 21 are shown moving in the direction of the arrow (right to left) of the figure and are shown positioned below the print wheel groups 801–804. The ribbon 807 of the machine is shown positioned above the tickets 21 but below the print wheels groups 801–804 so that when the bed 221 is lifted upwardly, to force the ticket against the ribbon and the print wheels, a line of type will be printed on the ticket. In FIG. 21, the ticket is shown in position to be imprinted by the two print wheels 343a and 344a and in this case the print wheel 343a is positioned to print on the stub (s) portion of the ticket and the print wheel 344a is positioned to print on the head (h) portion of the ticket.

(d) Color mark unit

The machine 200–300 has a unit 360, shown from the front in FIG. 4 and from the side in FIG. 9, for applying a mark of prescribed color as shown at station 16 of FIG. 3.

The color mark unit 360 includes a rotatable carousel within a housing 361 with individual container 362 of marking fluid. The carousel is driven by a motor 363 on a mounting bracket 364 upon command from the controller 600. The mounting bracket 364 also has a solenoid 365 which locks the carousel 361 in place when a designated one of the containers 362 is in marking position.

A fragmentary perspective view of the color mark unit 360 is shown in FIG. 11. The rotational position adopted by the carousel within the housing 361, and hence by the containers 362, is determined by the interaction between segments 366–a through 366–d of a cam assembly 366 and corresponding switches 367–a through 367–d of a switch assembly 367, positioned above the segments as shown in FIG. 11. The cam segments contain lobes which are positioned relative to each other in accordance with a particular code pattern. As the segments 366–a through 366–d rotate in unison, they operate associated switches 367–a through 367–d, positioned above them, to generate the electrical counterparts of the cam code pattern, which is compared with code signals set at the color comparator 520 (FIG. 2B). In addition there is a timing signal generated by a cam segment 366–e operating with switch 367–e for precise positioning of the selected container. When there is coincidence between the compared code signals the desired container, e.g. container 362–a, is in position for marking. As long as there is a failure of comparison, the carousel is rotated by the drive motor gear 363–a until code coincidence is obtained.

Thus, for example, the desired container 362–a shown in marking position in FIG. 11 may contain green ink. If the corresponding code is 1000, comparison is obtained when the first switch 367–a is activated by the lobe of the first segment 366–a and the remaining switches 367–b through 367–d are not activated by a lobe of their corresponding segments 366–b through 366–d With the container 362–a in position, color marking takes place, as shown at station 16 of FIG. 3 as the bed of the machine rises against the tip 362–b of the selected container. This depresses an internal valve (not shown) to allow the marking fluid to pass from the interior of the container in known fashion.

(e) The ticket collector

The ticket collector assembly 310 employed in the machine of FIG. 1 is shown with its cover removed and parts broken away in FIG. 9. The collector includes a number of demountable hoppers 311 which are carried between mounts of outboard and inboard chains 312 and 313. The chains are in turn carried by upper and lower sprockets with the lower sprocket being driven by a solenoid activated motor 314. A lamp 315 mounted within the assembly 310 is used with a photocell 316 on a mount projecting outwardly from the frame of the color mark unit to indicate whether or not the uppermost hopper 311-a is empty and, consequently, available for ticket collection.

In addition, as each hopper moves into collection position an arm 311-a closes a switch 317 that serves to indicate to the controller 600 (FIG. 2A) that the uppermost hopper is in its proper position to receive completed tickets.

The motor 314 is operated with a clutch (not shown) of a standard design such that the weight of tickets collected by the hoppers 311 will not cause reverse rotation. In a tested embodiment of the invention, the clutch of the collector motor 314 was of a quarter revolution variety for which each actuation of its solenoid indexed the lower sprocket by 90°.

(III) Detailed description of the interface

Referring to FIG. 2B, the circuitry of the interface 400–500 has been grouped for convenience into two sections 401 and 501 which respectively exercise control and information setting functions.

The control circuitry 401 serves as an interface between certain switches of the control panel 620 (FIG. 2A) and the feed bed 221 of the machine (FIG. 2C) through a control switching network 430. In addition, the control circuitry 401 includes a sever divide network 420 for operating the sever mechanism 240 (FIG. 2C). In effect, the sever network 420 "divides" input timing pulse signals supplied from the timing mechanism 250 through an amplifier 411 in order to produce periodic sever control pulses in accordance with the number of parts prescribed at the controller 600 (FIG. 2A) for the ticket structure of FIG. 3. The output of the amplifier 411 is also used in controlling, for example, the total number of tickets to be marked by the machine.

In the information setting circuitry 501, the constituents serve as an interface between the controller (FIG. 2A) and various marking instrumentalities of the machine, particularly the print head 320, the recording unit 350 and the color mark unit 360 (FIG. 2C).

The print head portion of the circuitry 501 includes a switching network 540 which operates the print head drive motor 321 and the bail-locking solenoids 332 (FIG. 9). In addition, the switching network 540 includes components for operating the ribbon solenoids 323 (FIG. 4). There is also a set of amplifiers or "drivers" 550 for each print head setting solenoid 345 (FIG. 10). The setting solenoids are enabled to release their associated setting gears whenever the print wheels are to be set with specified marking information. To supply sufficient signal strength to the setting solenoids, the "drivers" 550 take the form of individual amplifiers.

During setting of the print wheels, rotation of the motor 321 brings about the generation of timing pulse signals that are supplied to the distributor 660 from the setting circuitry 501 through an amplifier 511. By making use of the print head timing signals, the distributor is able to release the various setting solenoids 345 (FIG. 5) at prescribed times and thus set the individual print wheels as desired.

With respect to the recording of prescribed marking information on tickets, the setting circuitry 501 supplies timing signals generated at the machine (FIG. 2C) and gated by a mechanical "ticket-in-place" switch to the distributor 660 through an amplifier 512. The information to be recorded is then sent to the machine over a cable 513. Included in the cable 513 are leads for verification of what has been recorded and for operating a reject marking unit if there is a failure of verification.

Besides serving as an interface for recording and printing, the information setting circuitry 501 includes a color comparator 520 for controlling the position of the color unit 360 (FIG. 11). As long as the position of the color unit differs from what has been specified at the controller, as indicated by a mis-match at the comparator 520 between the code signals received from the color unit and those set from the controller, the color unit is rotated by its drive motor 363 (FIG. 11). When there is a comparison, rotation of the drive motor is terminated through a color unit switching network 530. Since rotation of the color unit, while the machine is operating could produce a smear on tickets at the color mark station, the machine is prevented from running until there is a comparison, at which point the output of the comparator 520 operates a gate in the control switching network 430.

The various amplifiers 411, 511 and 512 of the interface 400–500 are of conventional design, as are the amplifiers of the print wheels solenoid drivers 550. These amplifiers are desirably mounted on printed circuit boards, such as the board 410 shown in FIG. 1.

Details of the sever divide network 420, the color comparator 520, the control relay switching network 430, the print head switching network 540 and the color switching network 530 are discussed below.

(a) The sever divide network

Figure 12:
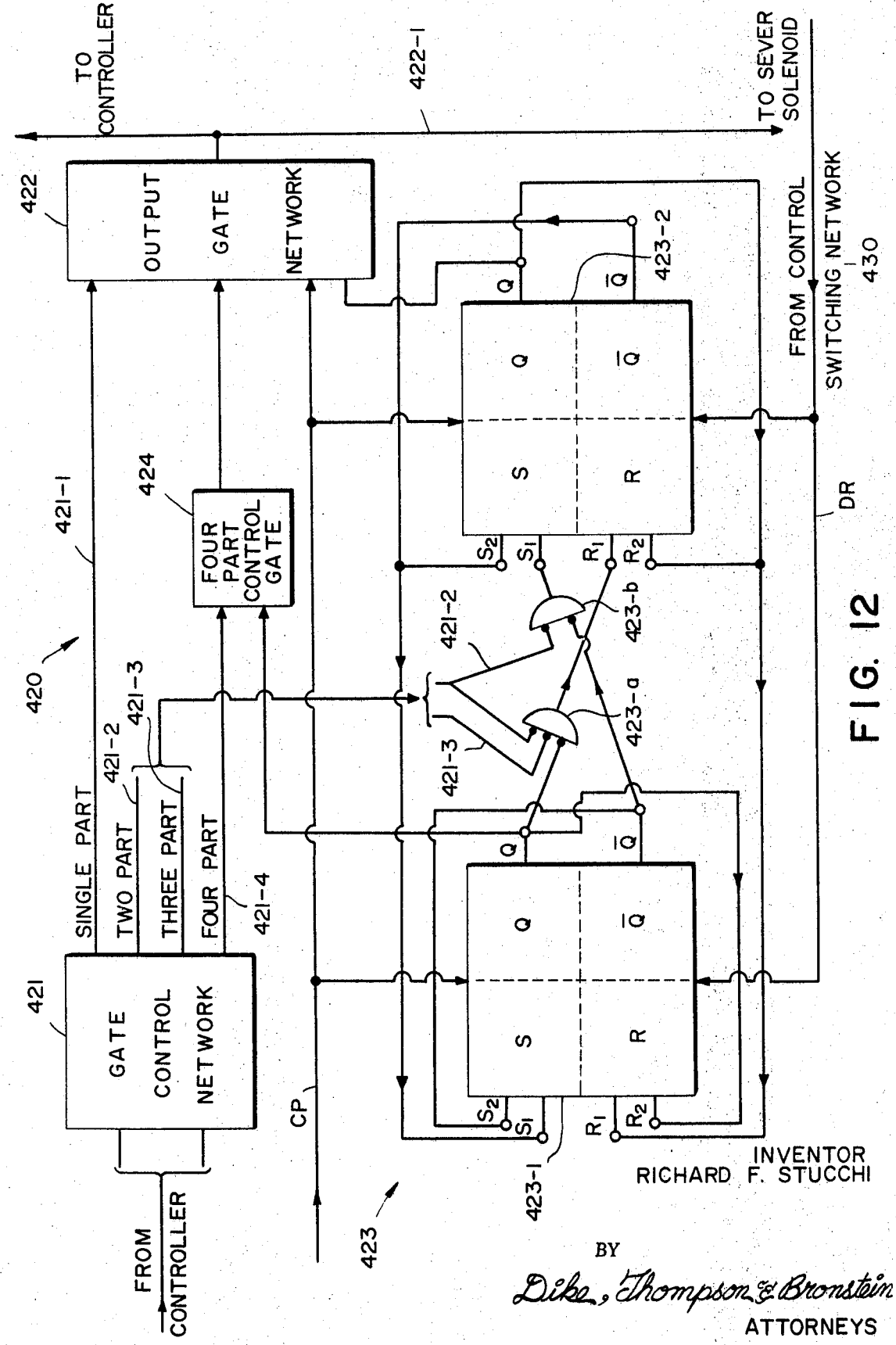

A schematic diagram of a suitable sever divide network 420 for the interface 400–500 of FIG. 2A is set forth in FIG. 12. This network is operated from the amplifier 411 and the control switching network 430 to produce a sever output for single or multiple tickets, as specified by binary code signals applied to a gate control network 421 from the controller 600 of FIG. 2A. Each binary code signal is in one of two possible states that are typically (1) a relatively high magnitude signal level representing a binary "1" or (2) a relatively low magnitude signal level representing a binary "0." The particular sever divide network 420 of FIG. 12 can be set from the controller for single, two, three or four-part tickets. Consequently, two input binary code signals are required at the gate control network 421 since the maximum number of ticket parts, i.e. 4, is the binary base digit 2 raised to the second power.

However, in the case of a single-part ticket a continuous output is provided directly at an output gate the gate control network 421. As a result, the single-part output is independent of the input from the timing amplifier 411. This eliminates the clicking that would otherwise accompany the cyclic actuation of the sever solenoid 244 (FIG. 5).

In the case of multi-part tickets, a shift register 423 of the network 420 is used in dividing the timing pulse signals obtained from the amplifier 411 by 2, 3 or 4 and, accordingly, a sever pulse appears at the output gate 422 for every second, third or fourth timing pulse to operate the sever solenoid 244.

The shift register 423 of the sever divide network 420 is formed by two stages 423–1 and 423–2. An output terminal Q of the second stage 423–2 is connected to the output gate 422 for two and three-part tickets. In the case of four-part tickets, the output from the second stage 423–2 is used in conjunction with an output gated from the first stage 423–1 through a control network 424.

The shift register 423 is re-entrant in that the output leads Q and $\bar{Q}$ of the second stage 423–2 are crossed-coupled to input leads $R_1$ and $S_1$ of the first stage 423–1. In addition, the stages 423–1 and 423–2 are crossed-coupled through NAND gates 423–a and 423–b. Each such gate produces an output corresponding to a binary "1" whenever it has any input corresponding to a binary "0." Conversely, the presence of all "1's" at the inputs of a NAND gate produces an output "0" NAND gates are also the principal constituents of the various control networks 421, 422 and 424. The NAND gates 423–a and 423–b are controlled from the network 421 according to whether a double, triple or quadruple-part ticket is desired.

The stages 423–1 and 423–2 are known as clocked "flip-flops" and are biased in conventional fashion. The term "flip-flop" refers to the fact that each stage has two stable and interchangeable signal states that are present at the respective output terminals Q and $\bar{Q}$. When one of the terminals Q or $\bar{Q}$ is in a "1" state, the other terminal $\bar{Q}$ or Q is in an "0" state. Thus, the signal state of Q is the inverse of $\bar{Q}$. "Clocking" has reference to the fact that the interchange of signal states between the terminals Q and $\bar{Q}$ is controlled by a regularly recurring clock or timing pulse signals that act in conjunction with applied inputs. The clock pulse signals are supplied to both stages 423–1 and 423–2 from the amplifier 411 of FIG. 2B over a clock pulse line CP.

In the schematic representation of the sever divide network of FIG. 12, the setting portion S of each stage 423–1 or 423–2 has two input terminals $S_1$ and $S_2$ while the re-setting portion R has two input terminals $R_1$ and $R_2$. The input terminals $S_2$ and $R_2$ of each stage are cross-coupled to the output terminals $\bar{Q}$ and Q. When there are "1's" on both setting terminals $S_1$ and $S_2$ and at least one "0" on the resetting terminals $R_1$ and $R_2$, the occurrence of a clocking signal will set the stage with a "1" at the Q output terminal (and a "0" at the $\bar{Q}$ terminal). Conversely, the presence of "1's" on both re-setting terminals $R_1$ and $R_2$ and at least one "0" on the setting terminals $S_1$ and $S_2$, with a clocking signal, produces a "0" at the Q output terminal (and a "1" at the $\bar{Q}$ terminal).

In addition to the setting or resetting of individual stages in conjunction with clock signals, direct resetting can take place on the direct reset line DR. In the system of FIG. 12 initial reset occurs over the line DR when a feed signal is applied by closing a switch on the panel 620 of the controller (FIG. 2A).

In a tested embodiment of the invention, the shift register stages 423–1 and 423–2 of FIG. 12 were integrated circuit modules of the kind sold and marketed by the Motorola Company under the designation MC845P. Each such module is advantageously packaged on a printed circuit board, such as the board 410 of FIG. 1.

To produce a single-part ticket, the output gate 422 of FIG. 12 is enabled continuously by having the code signals supplied from the controller to the gate control network 421, in order to specify a single-part ticket, produce a "0" on the single-part control line 421–1. Because of the NAND logic used in the output gate 422, the result is a continuous output.

To produce a sever pulse signal at the output gate 422 for every second timing pulse on the clock pulse line CP, both interstage NAND gates 423–a and 423–b have "0's" applied from the gate control network 423 over the two-part control line 421–2. Hence, both the setting and resetting terminals $S_1$ and $R_1$ of the second stage 423–2 are always enabled. Because the second stage is cross-coupled to itself, there is a change in its output for every clock pulse, irrespective of occurrences elsewhere in the sever divide network. The output of this stage is applied to the output gate 422 and is converted into a sever pulse on the sever divide output line 422–1 by each second timing pulse on the clock pulse line CP at the output gate 422.

To produce a sever pulse signal at the output gate 422 for every third timing pulse on the clock pulse line CP, only one of the interstage NAND gates 423–a or 423–b is continuously enabled. If the NAND gate 423–a connected to the reset terminal $R_1$ of the second stage 423–2 has a "0" applied to it over the three-part control line 421–3, its output will always be a "1." The second stage 423–2 changes state every third cycle of operation so that, in effect, the output on the sever line 422–1 is obtained by dividing the input on the clock pulse line CP by 3.

Each "divide-by-three" sequence is summarized in Table I below for the successive application of a reset signal DR and three clock pulses $CP_1$, $CP_2$, $CP_3$:

TABLE I

| Pulse Signal | State of First Register "Q"–"$\bar{Q}$" | State of Second Register "Q"–"$\bar{Q}$" |
| --- | --- | --- |
| DR | "0"–"1" | "0"–"1" |
| $CP_1$ | "1"–"0" | "0"–"1" |
| $CP_2$ | "1"–"0" | "1"–"0" |
| $CP_3$ (Output Generating Signal) | "0"–"1" | "0"–"1" |

The divide-by-three sequence begins with both stages 423–1 and 423–2 in the state "0"–"1" for Q and $\bar{Q}$, as established by signal on the direct reset line DR. Subsequently, the first clock pulse $CP_1$ of the sequence causes a change in state of the first stage 423–1, but not of the second stage 423–2. The second stage fails to change state because "0's" occur on both the setting terminal $S_1$ and the resetting terminal $R_2$ so that these terminals are disabled. Upon the occurrence of the second clock pulse $CP_2$ of the sequence, there is a change in stage of the second stage 423–2, but not of the first stage 423–1.

Thus, at the end of the second clock pulse $CP_2$ of the sequence, both stages have changed state in the same way and there is a "1" output on the Q terminal of the second stage 423–2. Consequently, when the third clock pulse $CP_3$ of the sequence is applied there, the output gate 423 is enabled. At the same time the stages 423–1 and 423–2 are reset.

To produce a sever pulse signal at the output gate 422 for every fourth timing pulse on the clock pulse line CP, the interstage NAND gates 423–a and 423–b act as inverters. Consequently, the changes in state of the two stages 423–1 and 423–2 are staggered, and there is a complete permutation of states for every fourth cycle of operation. In effect, there is an output on the sever line 422–1 that is obtained by dividing the input on the clock pulse line CP by 4.

Each divide-by-four sequence is summarized in Table II below for the successive application of a reset signal DR and four clock pulses $CP_1$, $CP_2$, $CP_3$ and $CP_4$:

TABLE II

| Pulse Signal | State of First Register "Q"–"$\bar{Q}$" | State of Second Register "Q"–"$\bar{Q}$" |
| --- | --- | --- |
| DR | "0"–"1" | "0"–"1" |
| $CP_1$ | "1"–"0" | "0"–"1" |
| $CP_2$ | "1"–"0" | "1"–"0" |
| $CP_3$ | "0"–"1" | "1"–"0" |
| $CP_4$ (Output Generating Signal) | "0"–"1" | "0"–"1" |

As with the three-part setting; the divide-by-four sequence begins with both stages 423–1 and 423–2 in the state "0"–"1" for Q and $\bar{Q}$, as established by a signal on the direct re-set line DR. Subsequently, the first clock pulse $CP_1$ of each sequence brings about a change in state in the first stage 423–1, but not of the second stage 423–2. The second stage 423–2 fails to change state because both a setting terminal $S_1$ and a resetting terminal $R_2$ are simultaneously disabled. Upon the occurrence of the second clock pulse $CP_2$ of the sequence, there is a change in the second stage 423–2, but not of the first stage 423–1. To that point, the divide-by-four sequence is like the divide-by-three sequence, except that different setting and resetting terminals are enabled. However, upon occurrence of the third clock pulse $CP_3$ of the sequence, only the first stage 423–1 returns to its reset state. The second stage 423–2 does not change because there is simultaneous disablement of a setting terminal $S_2$ and a resetting terminal $R_1$. The second stage 423–2 returns to its reset state following the occurrence of the fourth clock pulse $CP_4$.

The output of the second stage, in conjunction with the NAND gate 424, serves to generate an output during the fourth clock pulse $CP_4$.

Figure 12A:
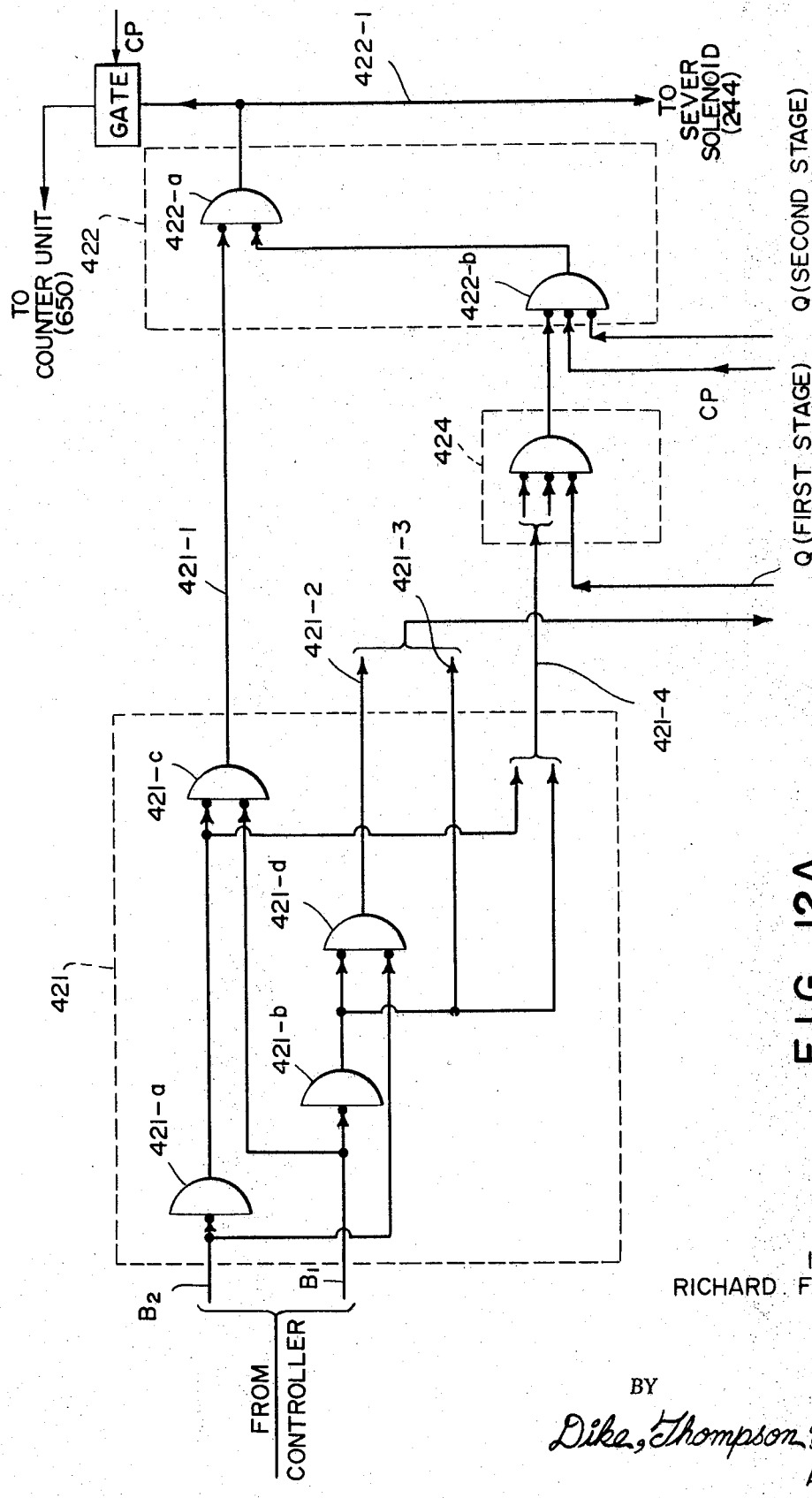
FIG. 12A is a schematic diagram of a control gating arrangement for the network of FIG. 12.

Details of the gating networks 421, 422 and 424 for the sever divide network 420 are set forth in FIG. 12A.

The gate control network 421 has two binary inputs $B_1$ and $B_2$. The relationship between the inputs and the number of ticket parts is summarized by Table III, below:

TABLE III

| Binary inputs $B_1$–$B_2$ | Number of ticket parts |
|---|---|
| "0"–"1" | 1 |
| "1"–"0" | 2 |
| "1"–"1" | 3 |
| "0"–"0" | 4 |

The gate control network 421 makes use of NAND logic. Both the complemented and uncomplemented inputs are needed to avoid ambiguity. The complements are generated by inverters 421–a and 421–b.

For a single-part ticket, the binary inputs $B_2$ and $B_1$ are "0" and "1." Because of the inversion of the input $B_2$, "1's" appear at a single-part control NAND gate 421–c, which produces a "0" output on line 421–1. The latter enables a NAND gate 422–a of the output gate network 422 to produce a continuous output on the line 422–1.

For two-part tickets, the binary inputs $B_2$ and $B_1$ are "1" and "0." Because of the inversion of the input $B_1$, "1's" appear at a multi-part control NAND gate 421–d. The result is a "0" on the two-part control line 421–2 which enables both interstage gates 423–a and 423–b (FIG. 12). When the direct output Q of the second stage 423–2 becomes a "1" the corresponding output of the first stage 422–1 is a "0." The latter is converted to a "1" by a control gate 424 and applied to an input NAND gate 422–b of the output gate network 422. The direct output Q of the first stage also appears at the gate 422–b, so that the subsequent occurrence of a clock pulse CP at the gate 422–b generates a "0" which converted to a "1" on the output line 422–1 for the duration of the clock pulse interval.

For three-part tickets, a control "0" is obtained on the line 421–3 for the interstage gate 423–a from the output of the second inhibit gate 421–b, which is "0" only for a three-part ticket. The four-part control gate 424 has a "1" output because of an input "0" from either inverter 421–a or 421–b. Therefore, the occurrence of each third clock pulse $CP_3$ in a three-part sequence produces a "1" on the output line 422–1 for the duration of the clock pulse interval.

In the case of a four-part ticket, both inverters 421–a and 421–b apply "1's" to the four-part gate 424. From Table II, it is seen that the direct outputs Q of the first and second stages 423–1 and 423–2 are "0" and "1," respectively, for each fourth clock pulse $CP_4$ of a four-part sequence, and an output on the line 422–1 is produced accordingly.

The output from the gate network 422 is also gated by the clock pulse line CP at a unit 425 to supply pulse signals to the counter unit 650 (FIG. 2A).

In a tested embodiment of the invention, the various NAND gates and inverters of the sever divide network 420 of FIGS. 12 and 12A were integrated circuit modules. Suitable modules are of the kind sold and marketed by the Motorola Company under the designations MC832P, MC846P and MC862P.

Each module 832P includes two NAND gates of four input terminals each. The gates have a high current-handling capacity, and one such module is illustratively employed for the constituent gates 422–a and 422–b of the output gate network 422.

In the case of the module 846P there are four NAND gates per module. Each gate is able to accommodate two inputs, but where inversion is desired only a single input is used. Accordingly, a single module can be used for the inverters 421–a and 421–b and the NAND gates 421–c and 421–d in the gate control network 421.

The module 862P has three gates per module, with three 34 inputs each. The gate 424 and the interstage gates 421–a and 421–b are illustratively on one such card.

(B) THE COLOR COMPARATOR

The color comparator 520 of FIG. 2B provides an output whenever the color mark unit 360 has been rotated to the position specified at the controller 600 (FIG. 2A). The number of binary code signals needed for that purpose depends upon the number of individual containers 362 within the housing 361 (FIG. 4).

In general, the relationship between the number $k$ of binary code signals and the number $n$ of containers is given by Equation 1:

$$2^{k-1} < n < 2^k \qquad (1)$$

Thus, where the carousel 361 has ten color mark containers 362, four binary signals are needed.

An illustrative color comparator 520' making use of NAND logic is set forth in FIG. 13. Such an arrangement permits construction of the comparator with modules having only NAND gates. For simplicity the circuitry has been limited to accommodate four color mark containers. Consequently, only two binary setting signals $C_1$ and $C_2$ from the controller are needed. It will be appreciated that the circuitry of FIG. 13 can be expanded to accommodate any number of color mark containers.

In the circuitry of FIG. 13, setting signals from the controller are compared with counterparts signals from the color mark unit 360 (FIG. 11). The result of the overall comparison is coordinated with a timing signal from the color mark unit to identify the time in the positioning cycle when a container is in a prespecified position.

The comparison is made by a bank of comparator units 522–1 and 522–2, there being one such unit for the signals representing each pair of bits being compared. In making the comparison, a direct signal from one source is compared with the inverse of the corresponding signal from the other source in an internal NAND gate 522–a (or 522–b). This provides an enabling, i.e. "1" output whenever a comparison is attained, regardless of whether any particular input is a "1" or a "0." In addition, within each unit 522–1 or 522–2, a second comparison is made of the counterpart signals of first comparison using a second internal NAND gate 522–b (or 522–a). This avoids any spurious enabling, i.e. "1" output because of ambiguity in the logic.

Inputs $C_1$ and $C_2$ from the controller are supplied directly to the comparator units 522–1 and 522–2. Inverse inputs $\overline{C_1}$ and $\overline{C_2}$ are supplied from inverters 521–a and 521–b of a gate control network 521. The latter is similar to the control network 421 used for the sever divide network of FIG. 12. Direct inputs $K_1$ and $K_2$ from the color unit, as well as inverse inputs $\overline{K_1}$ and $\overline{K_2}$ are supplied from a switch assembly 367, shown mechanically in FIG. 11 and schematically in FIG. 13.

When there is coincidence between the inputs $C_1$ and $C_2$ from the controller and the inputs $K_1$ and $K_2$ from the color mark unit, the internal NAND gates 522–a and 522–b of the comparator units 522–1 and 522–2 have "1" outputs. In addition, if any color mark container is in its position, there is a "1" at the output of the inverter 523 on the timing signal line T. The coincidence condition is sensed by a NAND gate 524, producing a "0" output. The latter is inverted by an output gate 525 to provide a positive going, i.e. "1" output to the control switching network 430 and the color unit switching network 530 (FIG. 2B).

Considering the operation of the switch assembly 367 in FIG. 13 with respect to the comparator units 522–1 and 522–2, there are two cam segments 366–a and 366–b for the color unit signals $K_1$ and $K_2$. There is also a timing cam segment 366–t for a timing signal T. The cam segments 366–a, 366–b and 366–t act upon associated switches 367–a, 367–b and 367–t.

The switches 367–a and 367–b are shown as sets of transfer contacts in FIG. 13. An "X" is used to indicate normally open contacts, while a bar is used for normally closed contacts. Each terminal extending to a set of transfer contacts is biased from a network 526 by a voltage source and an associated voltage dropping resistor. The result is a "0" on lines containing closed contacts, and a "1" on lines containing open contacts. When the switches 367–a and 367–b are operated there is an interchange of conditions, with the normally closed contacts becoming open and the normally opened contacts becoming closed.

For example, with the switch 367–a in contact with a depression of the cam 366–a, the normally closed contacts remain closed and the normally open contacts remain opened. As a result, there is a "0" on the line $\overline{K_1}$ and a "1" on the line $K_1$. This results from the fact that the voltage of the biasing source associated with the line $\overline{K_1}$ is dropped by its associated resistor through the closed contacts of the switch 367–a, but the voltage of the line $K_1$ is not dropped because of the open contacts of the switch 367–a.

An illustrative relationship between the cam segments 366–a, 366–b and 366–t and various colors of marking fluid within containers 362 of the carousel 361 (FIG. 11) is shown by the layout of FIG. 13A. The shaded regions of the layout represent the depressions on the various cam segments and, consequently, "1's" for the direct signals $K_1$ and $K_2$, while the unshaded regions represent cam lobes and, consequently, "0's."

Thus, to set the color mark unit 360 so that a container with blue ink is in marking position, the code signals applied from the controller are $C_1$="0" and $C_2$="1." With the cams 366–a, 366–b as shown in FIG. 13, the signal $K_1$ is "1" and the signal $K_2$ is "0." Consequently, the inputs to all of the gates of the comparator units 522–1 and 522–2 are "1's." As a result, the output gate 524 produces a "1" which is inverted to a "0" by the gate 525. The motor 363 (FIG. 5) of the color mark unit is operated until $K_1$ becomes "0" and $K_2$ becomes "1." At that point the comparator units 522–1 and 522–2 have "1" outputs. Nevertheless, there will still be no output to the various switching networks 430 and 530, to terminate the operation of the color unit drive motor and permit commencement of a ticket marking run, until the timing cam 366–t is in a position to provide a "1" output through its inverter 523. The timing cam 366–t assures proper selection of the correct color mark container.

As noted earlier, the various constituents of the comparator 520′ in FIG. 13 are multiple or single-input NAND gates, the latter serving as inverters. Consequently, fabrication of the comparator is facilitated by permitting the use of printed circuit modules with a single type of gating structure.

In a tested embodiment of the invention with ten color mark containers, making use of two additional comparator units (not shown) for control signals $C_3$ and $C_4$, five integrated circuit modules were employed. Four of the modules were of the type MC846P discussed in conjunction with the sever divide network. Of the four modules, one was used for input control signals $C_1$ through $C_4$ in circuitry patterned after the gate 521; two modules were employed in circuitry patterned after the comparator gates 522–1 and 522–2; while the fourth module was used for the NAND gate 523, the inverter 524 and additional gates (not shown) at the control switching network 430.

(c) The control switching networks

Switching within the interface 400–500 takes place in networks 430, 530 and 540 which respectively control the bed mechanism 220, the color mark unit 360 and various constituents of the print head 320.

Considering first the feed control network 430 and the color mark control network 530, their components are shown in FIG. 14 with related switches of the controller switch panel 620.

Associated with the feed control network 430 is a start switch 431 that is closed by an operator at the machine site in order to ready the marking system for operation. This action applies line voltage from an external power source 105 to the drive motor 231 (FIG. 4) by way of the cable 103. Even though the drive motor begins rotating, the feed bed remains inactive until the run solenoid 234–a is actuated. The latter is controlled remotely from the panel 620.

To initiate operation of the run solenoid 234–a, and bring about a periodic raising and lowering of the machine bed, a start switch 621 is closed at the control panel 620. A start relay 432 will then be energized if the contacts 202 and 203 of mechanical switches on the machine bed are in a closed condition. The contacts 202 are normally open and close only when ticket stock 20 (FIG. 4) is present on the bed. The other contacts 203 are normally closed and open only when the ticket stock becomes jammed.

When the start relay 432 energized, it closes normally open contacts 432–a in a voltage supply line of the run solenoid 234–a. The latter is then operated when a run relay 433 is actuated to close normally open contacts 433–a.

The run relay 433 is powered from a direct current source 622, at the control panel 620, through a run switch 623, a position switch 317 for the collector 310 (FIG. 9) and a gate 434 of the network 430. If the collector has not been indexed so that one of its hoppers is not in position to receive completed tickets, the position switch 317 is open, and the run relay 433 cannot be energized. Similarly, the run relay 433 cannot be energized. Similarly, the run relay 433 cannot be energized unless the color unit 360 (FIG. 11) is in the desired position, since there will be no enabling output from color comparator (FIG. 13) and the gate 434 will be open.

Thus, the gate 434 prevents the feed bed of the machine from being raised and lowered as long as there is rotation of the color mark unit. The gate 434 is advantageously formed by NAND logic. Since the output of a NAND gate is a "0" when its inputs are "1's," an inverter is used to provide a positive going "1" output for operating the run relay 433. It will be appreciated the gate 434 may take other forms, including a conventional AND gate.

With both the start and run relays 432 and 433 energized, the run solenoid 234–a acts upon the clutch 233 and brings about rotation of the drive shaft 232 (FIG. 4) to periodically raise and lower the bed of the machine.

The feed of tickets to the various marking stations of the machine is subsequently commenced by the closure of a feed switch 624 at the control panel 620. If there is no output from the counter unit 650 (FIG. 2A) to operate an inhibit gate 625, a feed relay 435 operates to close a set of contacts 435–a. These contacts are in the supply line that extends to the feed solenoid 234–b through contacts 433–b, which were previously closed by the run relay 433. As explained previously, the feed solenoid lowers the ticket stock at the input of the feed bed into contact with feed pawls 223 (FIG. 3). When the counter unit signals the end of a ticket marking run, the inhibit gate 625 disables the feed relay 435.

Turning to the print head switching network 540, details are shown schematically in FIG. 15. The drive signals that bring about the rotation of the print wheel motor 321 (FIG. 10) are initiated at the control panel by the closure of a switch 626. The latter is connected to the direct current source 622 of the control panel 620 and is ganged with the run switch 623 so that the print wheels are settable only when the machine is not running. This permits the print wheels to be set without interference because of the raising and lowering of the feed bed.

Closure of the print wheels setting switch 626 causes a flip-flop 681–a within a print wheels control unit 680 of the distributor 660 (FIG. 2A) to change state. The flip-flop 681-a is of standard design and, upon changing state, activates a print motor relay 541. This closes relay contacts 541-a and permits current from the external power source 105 to be applied to the print motor 321 through the normally closed contacts 542-a of a motor direction reversal relay 542.

Simultaneously with the powering of the print wheel motor relay 541, the flip-flop 681-a enables a timer unit 681-b to produce a pulse output at the end of a predetermined time interval. The latter produces an output for the time interval during which the direction of rotation of the print motor 321 is to be reversed. Accordingly, it activates a direction relay 542 and closes normally open contacts 542-b, while opening normally closed contacts 542-a. Since this changes the connection of the supply lead, the motor 321 reverses its direction of rotation.

Operation of the drive motor relay 541 also closes contacts 541-b and 541-c to allow current from the source 105 to be applied to the bail locking solenoids 332 (FIG. 4) in order to release the print wheels.

The network 540 additionally includes components for driving the ribbon (not shown) used with the print head 320. The ribbon is carried by spools (not shown) mounted on spindles 322–1 and 322–2 (FIG. 4) and driven by rotary solenoids 323–1 and 323–2. When one of the solenoids is used for clockwise rotation of its associated spool; the other solenoid is used for counterclockwise rotation of its spool.

Power for the solenoids 323–1 and 323–2 is obtained through a diode 544 and a limiting resistor 545. The latter are switched to a capacitor and one of the solenoids to cause the armature of that solenoid to rotate and engage a ratchet attached to the ribbon spool. When the solenoid is de-energized, it pulls away, freeing the spool. The duty cycle, i.e. "on"-"off" time of the solenoid is regulated by a switch 204 that is cam-operated every machine cycle.

A latching relay, represented by a switch 205, is actuated to select the solenoid that is to be operated.

The position of the latching relay 205 is established by eyelets on the ribbon to bring about a change in setting each time the ribbon is substantially taken up by one of the spools. Each eyelet, at the end of ribbon travel in one direction, moves a linkage to reset the latch relay 205, i.e. connect the energizing circuit to the other ribbon solenoid. In a tested embodiment of the marking system, the eyelets were positioned to allow approximately ninety percent of the ribbon surface to be used.

Thus, the ribbon is steppingly advanced during each cycle of machine operation until unwound from one spool and wound on the other, after which the switch 205 is tripped to bring about the stepping advance of the ribbon in the opposite direction beginning with the next cycle of machine operation.

(IV) Detailed description of the controller

In addition to the control panel 620, the controller 600, as outlined by FIG. 2A, includes a card reader 640 for supplying setting signals to the sever divide network 420 and the control comparator 520 of the interface (FIG. 2B). The card reader 640 also supplies setting signals to the counter unit 650 and the distributor 660. The signals sent to the distributor specify the information that is applied to the tickets by the print head 320 and the recording unit 350 (FIG. 2C).

(a) The card reader

The card reader 640 is of standard construction and is operated by switches of the control panel 620. It is used to read individual cards 610 that are prepunched in accordance with the particulars of a ticket marking run.

Thus, each card is punched to specify (1) the information to be imprinted and magnetically recorded on the ticket structure; (2) the total number of tickets in the run; (3) the number of parts in each ticket; and (4) the color of any desired auxiliary mark.

The cards 610 are advantageously of the type used in conventional data processsing. Each card is able to accommodate up to eighty columns of information in twelve rows per column. Thus, for the ticket structure of FIG. 1A the first thirty-five columns of a card are used to identify the thirty-five characters constituting the merchandising information imprinted in four rows of the header h and duplicated in three rows on the stub s and in a single row on the tab t. The rows of each set contain ten characters each, except for the fourth row of each set which has five characters illustratively indicating price.

Beyond the first thirty-five columns of the punched card there are four columns that allow up to 9,999 tickets to be designated per run. In practice it has been found that the average run generally is less than 100 tickets. For illustrative machine under consideration the number of parts per ticket is four or less, and only a single column is needed for that purpose. Finally, the color unit has ten individual containers as specified using two additional columns. Consequently, forty-two columns are needed in all.

Since the foregoing information makes use of no more than eleven different characters, including the "blank" character, a single punch per column suffices. While some print wheels have alphabetic characters, the total number of characters on any print wheel is nevertheless no greater than eleven. In the general case, alphabetic characters are represented by plural punches per column.

In the case of punched information specifying ticket quantity, the number of ticket parts, and color mark, the card reader 640 is prewired to provide a binary coded output signal. The print wheel and recording information, on the other hand, is transferred directly to the distributor 660.

For reading, a switch of the panel 620 is closed to feed an individual card into the reader 640, where the punches are sensed mechanically, electrically or optically. A second switch is closed to transfer the information that has been read.

(b) The signal distributor

Pulse signals corresponding to the information to be imprinted and magnetically recorded on the ticket structure enter a buffer register 661, containing eleven flip-flops for each column of the card. From the register 661, information signals are transferred to a recording control unit 670 and to a print wheels control unit 680.

Referring to FIG. 16 and the details of the recording control unit 670, the signals from the buffer 661 enter a converter 671 that is prewired to produce a six bit binary code word for each column of the punched card. This format has been chosen for compatibility with the ASCII (American Standard Code for Information Interchange) system which allows each code word to represent any one of 64 alphanumeric characters. While the print wheels on the print head of the illustrative system are each limited to eleven characters, including the blank character, so that four bits would suffice, the recorded information can be more extensive. Further, the converter 671 includes parity bit generating equipment so that each six-bit word is accompanied by an additional bit which is "1" or "0" depending upon (1) whether the parity is to be odd or even and (2) the number of "1's" in the code word. The presence of the parity bit is important when the recorded information is decoded for control purposes.

Thus, the card code representing the number 3 includes a single punch in one of the card columns. The punch is translated by the converter 671 into a six bit binary counterpart or 000011. In addition, in the case of odd parity, a seventh or parity bit is generated, resulting, for example, in the code word 1000011.

From the converter 671, the binary code signals are transferred in two separate groups to shift registers 672–1 and 672–2, since the recording unit 350 (FIG. 7) employs two read-write heads 352 and 253. Each register 672–1 or 672–2 is preset with prefix and suffix code words to identify both the beginning and the end of each recording sequence. Illustratively, each suffix or prefix code word consists of seven consecutive "1's." The informational code words from the converter 671 enter the registers 672–1 and 672–2 either directly or through gates (not shown) that are controlled from the switch panel 620.

In the recording unit 350 (FIG. 7) rotation of the cylindrical support 351 generates internal clock pulses. These are carried to the recording control unit 670 by a clock pulse line 674–a and are applied to the shift registers 672–1 and 672–2 through timed gates 673–1 and 673–2. The latter are enabled by the timing signal received from the record timing mechanism 250 (FIG. 2) on a timing line 674–b. The timing of the gates 673–1 and 673–2 is such that recording will take place only during a pre-specified interval. In addition, the shift registers 672–1 and 672–2 are re-entrant so that as the clock pulses cause the stored information to appear serially on the recording lines 675–a and 675–b, the same information is returned to the registers for use during the next machine cycle.

The serial bit stream on the recording lines 675–a and 675–b energizes internal coils of the unit 350 to record the desired information in the magnetic coating of the ticket structure. One of the lines 675–a or 675–b is for the outer recording track, while the other is for the inner recording track.

Recording is completed during one revolution of the read-write heads 352 and 353. During the next revolution, the magnetic field produced into the coating is sensed by the heads 352 and 353, giving rise to bit signals on verify lines 676–a and 676–b. The signals on these lines are applied to respective verification shift registers 676–1 and 676–2. When a prefix code group enters the prefix portion of each register, indicating that a replica of the recorded information is present, respective control gates 677–1 and 677–2 operate to allow a bit-by-bit verification of the replica with the original in comparators 678–1 and 678–2. Whenever verification cannot be made, a signal is supplied through an OR gate 679 to the reject marking station of the machine and to the counter unit 650. This signal activates a solenoid to operate the reject marking stamp; it is supplied to the counter unit 650 to permit an adjustment in the specified ticket quantity count.

The circuitry of recording control unit 670 of FIG. 17 is adapted for serial recording. Alternatively, where the recording unit 350' of FIG. 8 is employed, the circuitry of FIG. 17 is adapted for parallel recording with control pulses obtained from the photocell assemblies 228 and 229 (FIG. 8).

(c) The print wheels control unit

A block diagram of an illustrative print wheels control unit 680 is set forth in FIG. 17. Operation of the unit 680 is initiated from the control panel 620.

As explained in conjunction with the discussion of the print wheel switching network 540 (FIG. 15), enablement of a flip-flop 681–a initiates rotation of the print wheels drive motor. It also sets a signal distributor 682, so that there is a gating output on each of its terminals 683–a through 683–k.

Rotation of the print wheels drive motor generates commutator timing pulses, which serve as clock pulses for the pulse signal distributor 682. After an interval determined by a timer 681–b, a motor reversing signal is produced, and an AND gate 685 is enabled to allow the commutator timing pulses to act upon the distributor 682. The AND gate 684 prevents any change in the distributor 682 until after the print wheels have been collectively reset to the blank character.

The pulse signal distributor 682 responds to the commutator timing pulses to produce successive changes in signal level on output lines 683–a through 683–k. The latter are associated with successive characters, e.g. "blank," "zeros," "threes" of the individual print wheels.

The print wheel information signals in the buffer register 661 and the outputs of the pulse signal distributor 682 act jointly upon a selector gate network 684. Illustratively, the network 684 has eleven flip-flops for each column of print wheels information carried by any control card of the deck 610. This in order to imprint thirty-five characters upon a control ticket, the flip-flops in the network 684 form a matrix of thirty-five columns with eleven rows each.

One of the flip-flops in each column is set from the buffer register 661 according to the particular character desired for the associated print wheels. Each flip-flop that has been set is gated from the distributor. As the outputs of the distributor change at the successive terminals 683–a through 683–k in successive instants of time, the outputs from the selector network 684 are selectively terminated. For example, if the second print wheel column of a card contains a punch mark corresponding to a three, the third row flip-flop in the second column of the matrix network 683 will be enabled. This energizes a setting solenoid and retracts an arm that otherwise prevents a setting from moving freely. When the output of the pulse distributor on the "threes" terminal 783–d terminates, the flip-flop in the third row of the second column in the matrix network 683 is no longer gated and there is no longer any output to the particular print wheel setting solenoid.

An alternative embodiment of the print wheels control unit 680' makes use of NAND logic and is shown in FIG. 19. An initiating flip-flop 681–c is used of the kind employed in the sever divide network 420 (FIG. 12), except that the input signals are applied to a direct set terminal DS and a direct reset terminal DR. The mode of operation for such a flip-flop is summarized in Table IV, below:

TABLE IV

| Inputs "DS"–"DR" | Outputs "Q"–"Q" |
|---|---|
| "1"–"1" | Unchanged |
| "0"–"1" | "1"–"0" |
| "1"–"0" | "0"–"1" |
| "0"–"0" | "1"–"1" |

Before the switch 626' is closed at the controller, a local direct current source 627 applies a "1" to the direct set terminal DS of the initiating flip-flop 681–c and to one input of a NAND gate 681–d. The other input terminal of the gate 681–d is also supplied with a "1," since the $\overline{Q}$ output of the last stage of the distributor 682 is "1" before re-set takes place. Consequently the direct reset input DR of the initiating flip-flop 681–c is "0." The corresponding Q–$\overline{Q}$ outputs are therefore "0"–"1."

When the switch 626' is closed, the source 627 is grounded and a "0" is applied to the direct set terminal DS. This causes a change in output, which initiates a sequence of actions comparable to those described for the circuitry of FIG. 17, except that the operations of the various flip-flops are in accordance with Table IV.

The distributor 682 consists of a cascaded chain of flip-flops 682–a through 682–j of the kind used in the sever divide network 420 (FIG. 12). These flip-flops are preset so that when a direct set signal is received at the terminals DS a "1" appears at all of the Q terminals. As the clock pulses are applied, the flip-flops are successively reset. After the tenth timing pulse has been received, the tenth flip-flop 682–j is reset and an output supplied to NAND gates 681–d, 681–g and 681–h to terminate the operation of the print wheels drive motor and to reset the flip-flop 681–c.

Instead of taking the form of matrix of rows and colums, with each position of the matrix having a single flip-flop, the selector network 684 (FIG. 17) may include manually controlled eleven-point, i.e. eleven-contact switches, with one switch for each column of the matrix. The row positions of the switch contacts are ganged together, with successive rows connected to the "blank," "zeros," etc. lines of the print wheels control unit 680. The wiper of each switch is connected to a driver amplifier of a setting solenoid.

(d) The counter unit

The counter unit 650, as shown by FIG. 19, includes a quantity counter 651 and a collector indexing counter 652. The quantity counter 651 is set from the controller and it is decremented by the output pulses received from the sever divide network 420 (FIG. 12). When the counter 651 has been decremented to a zero it produces an output which acts upon gate 625 (FIG. 14) and terminates further operation of the machine.

Whenever there is a failure to verify the information that has been magnetically recorded, a reject signal from the recording control unit 670 (FIG. 17) sets a flip-flop 653. Upon the occurrence of the next sever divide output a gate 654 is operated to allow the pre-existing quantity count to be supplemented in an adder 656 by the number of ticket parts $m$, as set in a register 655. This restores the counter 651 to the condition that existed before the occurrence of the reject signal. The reject flip-flop 653 is reset through a delay line 657 by the sever divide signal at the end of the multi-part count interval. Thus a rejection may take place anywhere during a multi-part interval without affecting the counting operation.

The collector indexing counter 652 which appears in the counter unit 650 receives the single-part timing signals from the amplifier 411 (FIG. 2A) and is decremented accordingly. It is mechanically preset for a convenient count, such as 144, that depends upon the capacity of the hoppers used in the collector (FIG. 9). When the collector counter 642 is decremented to zero, it supplies an indexing pulse signal to the drive motor 314 of the collector 310 (FIG. 9). The output used in indexing the collector may be controlled manually from the control panel.

While various aspects of the invention have been set forth by the drawings, it is to be understood that the foregoing detailed description is for illustration only and that various changes in shape, proportion, arrangement of parts, as well as the substitution of equivalent elements for those shown and described, may be made without departing from the spirit and scope of the invention as set forth in the appended claims.

I claim:

1. An apparatus comprising a print wheel having type characters thereon movable to present a selected character opposite a print point, a rotatable shaft, movable in forward and reverse directions, a gear slippably mounted on said shaft and adapted to be rotated therewith in forward and reverse directions, said gear being drivingly connected with said print wheel to move same to set and reset position, first stopping means selectively cooperable with one portion of said gear to arrest rotating movement thereof in one direction to present the selected type character in print position, and second stopping means spaced from the said first stopping means and cooperable with another portion of said gear to arrest gear movement in the other direction to return said print wheel to reset position when rotated in the other direction.

2. An apparatus according to claim 1 in which said gear has a plurality of teeth and in which said first stopping means comprises an arm adapted to be positioned between two teeth of said gear to arrest its movement.

3. An apparatus according to claim 2 in which said arm is actuated by a solenoid.

4. An apparatus according to claim 1 in which said second stopping means is constructed to prevent said gear from making a complete revolution.

5. An apparatus according to claim 1 in which said second stopping means comprises a raised tooth formed on said gear.

6. An apparatus according to claim 1 in which said second gear comprises a plurality of teeth and wherein said second stopping means comprises filling between two of said plurality of teeth.

7. An apparatus according to claim 1 in which said gear includes a pin mounted thereon and in which said second stopping means comprises a member positioned to engage said pin.

8. An apparatus according to claim 1 in which the print wheel has a plurality of teeth which mesh with teeth provided on said gear, some of said teeth of said print wheel being formed with type characters.

9. An apparatus comprising a plurality of print wheels, each having type characters thereon and each movable to present a selected character opposite a print point, a rotatable shaft movable in forward and reverse directions, a plurality of gears slippably mounted on said shaft and adapted to be rotated therewith in forward and reverse directions, each of said gears being drivingly connected to a different one of said print wheels, a plurality of first stopping means, each of said first stopping means selectively cooperable with one portion of a different one of said gears to arrest rotating movement of each gear in one direction to present the selected type character on each of said print wheels in print position, and a plurality of second stopping means, each of said second stopping means spaced from each of said plurality of first stopping means and cooperable with another portion of said gear and each adapted to arrest gear movement of a different one of said gears in the other direction to return each print wheel to reset position when rotated in the other direction.

10. An apparatus according to claim 9 in which each of said first stopping means comprises an arm movable to engage one tooth of the gear with which is cooperates.

11. An apparatus according to claim 10 in which each of said second stopping means comprises a raised tooth formed on each of said gears.

12. An apparatus according to claim 10 in which each of said second stopping means comprises a member fixed in place and positioned to engage a pin portion provided on each of said gears.

13. An apparatus according to claim 10 in which each of said gears includes a plurality of teeth and in which each of said second stopping means comprises filling between two teeth on each of said gears.

References Cited

UNITED STATES PATENTS

| | | | |
|---|---|---|---|
| 2,655,098 | 10/1953 | Dutro et al. | 101—19 |
| 2,661,684 | 12/1953 | Buhler | 101—93 |
| 2,708,873 | 5/1955 | Braun | 101—19 |
| 2,754,751 | 7/1956 | Marsh et al. | 101—19 |
| 2,890,650 | 6/1959 | Bone et al. | 101—19 |
| 2,968,236 | 1/1961 | Swett | 101—19 |
| 3,036,520 | 5/1962 | Bone | 101—78 |
| 3,046,878 | 7/1962 | Westbrook | 101—93 |
| 3,095,807 | 7/1963 | Bone | 101—19 |
| 3,331,315 | 7/1967 | Henry | 101—68 |

WILLIAM B. PENN, Primary Examiner

U.S. Cl. X.R.

101—66